(12) United States Patent  
Zhang et al.

(10) Patent No.: US 10,338,205 B2  
(45) Date of Patent: Jul. 2, 2019

(54) BACKSCATTER COMMUNICATION AMONG COMMODITY WIFI RADIOS

(71) Applicant: The Board of Trustees of the Leland Stanford Junior University, Palo Alto, CA (US)

(72) Inventors: Pengyu Zhang, Palo Alto, CA (US); Dinesh Bharadia, Menlo Park, CA (US); Kiran Joshi, Sunnyvale, CA (US); Sachin Katti, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 15/676,474

(22) Filed: Aug. 14, 2017

(65) Prior Publication Data  
US 2018/0212807 A1   Jul. 26, 2018

Related U.S. Application Data

(60) Provisional application No. 62/374,703, filed on Aug. 12, 2016.

(51) Int. Cl.  
*H04B 5/00* (2006.01)  
*G01S 13/00* (2006.01)  
(Continued)

(52) U.S. Cl.  
CPC ............ *G01S 13/00* (2013.01); *G01S 13/751* (2013.01); *H04B 5/00* (2013.01); *H04L 27/066* (2013.01);  
(Continued)

(58) Field of Classification Search  
CPC ........ G01S 13/00; G01S 13/74; G01S 13/751; G01S 13/755; G01S 13/756;  
(Continued)

(56) References Cited

U.S. PATENT DOCUMENTS 3,922,617 A    11/1975   Denniston  
4,952,193 A     8/1990   Talwar  
(Continued)

FOREIGN PATENT DOCUMENTS

EP    0755141 A2   1/1997  
EP    1959625 B1   2/2009  
(Continued)

OTHER PUBLICATIONS

Abari, et al., "Caraoke: An E-Toll Transponder Network for Smart Cities," *Proceedings of the 2015 ACM Conference on Special Interest Group on Data Communication*, SIGCOMM '15, pp. 297-310, ACM, (2015). [Retrieved from the Internet Nov. 27, 2017: <http://www.mit.edu/~abari/Papers/Sigcornm15.pdf>].

(Continued)

*Primary Examiner* — Duc M Nguyen  
(74) *Attorney, Agent, or Firm* — Alston & Bird LLP

(57) ABSTRACT

A backscatter tag communicate device includes, in part, a receiver configured to receive a WiFi packet conforming to a communication protocol defining a multitude of codewords, a mapper configured to map at least a first subset of the multitude of codewords disposed in the packet to a second multitude of codewords defined by the protocol, and a frequency shifter configured to shift a frequency of the second multitude of codewords such that the frequency shifted codewords are characterized by a single sideband spectrum. The communication protocol may be the 802.11b communication protocol. The mapper may optionally map the first subset of the multitude of codewords by changing phases of the first subset of the multitude of codewords.

16 Claims, 10 Drawing Sheets

(51) Int. Cl.
*H04L 27/06* (2006.01)
*G01S 13/75* (2006.01)
(52) U.S. Cl.
CPC ........... *G01S 13/755* (2013.01); *G01S 13/758* (2013.01); *H04B 5/0031* (2013.01); *H04B 5/0062* (2013.01)
(58) Field of Classification Search
CPC ....... G01S 13/758; H04B 5/00; H04B 5/0025; H04B 5/0031; H04B 5/0056; H04B 5/0062
See application file for complete search history.

(56) References Cited

U.S. PATENT DOCUMENTS

| | | |
|---|---|---|
| 5,212,827 A | 5/1993 | Meszko et al. |
| 5,444,864 A | 8/1995 | Smith |
| 5,691,978 A | 11/1997 | Kenworthy |
| 5,734,967 A | 3/1998 | Kotzin et al. |
| 5,790,658 A | 8/1998 | Yip et al. |
| 5,818,383 A | 10/1998 | Stockburger et al. |
| 5,930,301 A | 7/1999 | Chester et al. |
| 6,215,812 B1 | 4/2001 | Young et al. |
| 6,411,250 B1 | 6/2002 | Oswald et al. |
| 6,539,204 B1 | 3/2003 | Marsh et al. |
| 6,567,649 B2 | 5/2003 | Souissi |
| 6,639,551 B2 | 10/2003 | Li et al. |
| 6,725,017 B2 | 4/2004 | Blount et al. |
| 6,745,018 B1 | 6/2004 | Zehavi et al. |
| 6,965,657 B1 | 11/2005 | Rezvani et al. |
| 7,336,940 B2 | 2/2008 | Smithson |
| 7,349,505 B2 | 3/2008 | Blount et al. |
| 7,362,257 B2 | 4/2008 | Bruzzone et al. |
| 7,426,242 B2 | 9/2008 | Thesling |
| 7,564,396 B2 | 7/2009 | Van Veldhoven et al. |
| 7,869,527 B2 | 1/2011 | Vetter et al. |
| 8,005,235 B2 | 8/2011 | Gupta et al. |
| 8,060,803 B2 | 11/2011 | Kim |
| 8,086,191 B2 | 12/2011 | Fukuda et al. |
| 8,155,595 B2 | 4/2012 | Sahin et al. |
| 8,175,535 B2 | 5/2012 | Mu |
| 8,179,990 B2 | 5/2012 | Orlik et al. |
| 8,218,697 B2 | 7/2012 | Guess et al. |
| 8,331,477 B2 | 12/2012 | Huang et al. |
| 8,351,533 B2 | 1/2013 | Shrivastava et al. |
| 8,385,871 B2 | 2/2013 | Wyville |
| 8,422,540 B1 | 4/2013 | Negus et al. |
| 8,755,756 B1 | 6/2014 | Zhang et al. |
| 8,995,410 B2 | 3/2015 | Balan et al. |
| 9,042,838 B2 | 5/2015 | Braithwaite |
| 9,054,795 B2 | 6/2015 | Choi et al. |
| 9,065,519 B2 | 6/2015 | Cyzs et al. |
| 9,077,421 B1 | 7/2015 | Mehlman et al. |
| 9,124,475 B2 | 9/2015 | Li et al. |
| 9,184,902 B2 | 11/2015 | Khojastepour et al. |
| 9,246,554 B2* | 1/2016 | Maguire .............. H04B 5/0037 |
| 9,325,432 B2 | 4/2016 | Hong et al. |
| 9,367,711 B1 | 6/2016 | Dacus et al. |
| 9,887,728 B2 | 2/2018 | Jain et al. |
| 2002/0064245 A1 | 5/2002 | McCorkle |
| 2003/0031279 A1 | 2/2003 | Blount et al. |
| 2003/0053659 A1 | 3/2003 | Pavlidis et al. |
| 2003/0099287 A1 | 5/2003 | Arambepola |
| 2003/0148748 A1 | 8/2003 | Shah |
| 2004/0106381 A1 | 6/2004 | Tiller |
| 2005/0078743 A1 | 4/2005 | Shohara |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0044147 A1 | 3/2006 | Knox et al. |
| 2006/0058022 A1 | 3/2006 | Webster et al. |
| 2006/0083297 A1 | 4/2006 | Yan et al. |
| 2006/0209754 A1 | 9/2006 | Ji et al. |
| 2007/0003141 A1 | 1/2007 | Rittscher et al. |
| 2007/0018722 A1 | 1/2007 | Jaenecke |
| 2007/0105509 A1 | 5/2007 | Muhammad et al. |
| 2007/0207747 A1 | 9/2007 | Johnson et al. |
| 2007/0223617 A1 | 9/2007 | Lee et al. |
| 2007/0249314 A1 | 10/2007 | Sanders et al. |
| 2007/0274372 A1 | 11/2007 | Asai et al. |
| 2008/0004796 A1 | 1/2008 | Schott et al. |
| 2008/0037801 A1 | 2/2008 | Alves et al. |
| 2008/0089397 A1 | 4/2008 | Vetter et al. |
| 2008/0107046 A1 | 5/2008 | Kangasmaa et al. |
| 2008/0129581 A1 | 6/2008 | Douglass et al. |
| 2008/0131133 A1 | 6/2008 | Blunt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0147837 A1* | 6/2009 | Lau .................. H04L 27/0008 375/219 |
| 2009/0180404 A1 | 7/2009 | Jung et al. |
| 2009/0186582 A1 | 7/2009 | Muhammad et al. |
| 2009/0221231 A1 | 9/2009 | Weng et al. |
| 2009/0262005 A1 | 10/2009 | McNeill et al. |
| 2009/0303908 A1 | 12/2009 | Deb et al. |
| 2009/0305650 A1 | 12/2009 | Wenger et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Yeh et al. |
| 2010/0117693 A1 | 5/2010 | Lorg et al. |
| 2010/0136900 A1 | 6/2010 | Seki |
| 2010/0150033 A1 | 6/2010 | Zinser et al. |
| 2010/0159837 A1 | 6/2010 | Dent et al. |
| 2010/0159858 A1 | 6/2010 | Dent et al. |
| 2010/0215124 A1 | 8/2010 | Zeong et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0279602 A1 | 11/2010 | Larsson et al. |
| 2010/0295716 A1 | 11/2010 | Yamaki et al. |
| 2011/0013684 A1 | 1/2011 | Semenov et al. |
| 2011/0026509 A1 | 2/2011 | Tanaka |
| 2011/0080264 A1 | 4/2011 | Clare et al. |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0243202 A1 | 10/2011 | Lakkis |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0032843 A1 | 2/2012 | Lee et al. |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0161931 A1* | 6/2012 | Karmakar ............ G01S 13/753 340/10.1 |
| 2012/0201153 A1 | 8/2012 | Bharadia et al. |
| 2012/0201173 A1 | 8/2012 | Jain et al. |
| 2012/0319819 A1 | 12/2012 | Tkachenko |
| 2012/0321006 A1 | 12/2012 | Akita et al. |
| 2013/0005284 A1 | 1/2013 | Dalipi |
| 2013/0044791 A1 | 2/2013 | Rimini et al. |
| 2013/0089009 A1 | 4/2013 | Li et al. |
| 2013/0102254 A1 | 4/2013 | Cyzs et al. |

(56) References Cited

U.S. PATENT DOCUMENTS

| | | | |
|---|---|---|---|
| 2013/0114468 | A1 | 5/2013 | Hui et al. |
| 2013/0155913 | A1 | 6/2013 | Sarca |
| 2013/0166259 | A1 | 6/2013 | Weber et al. |
| 2013/0194419 | A1 | 8/2013 | Bhowmick et al. |
| 2013/0194984 | A1 | 8/2013 | Cheng et al. |
| 2013/0215805 | A1 | 8/2013 | Hong et al. |
| 2013/0225101 | A1 | 8/2013 | Basaran et al. |
| 2013/0253917 | A1 | 9/2013 | Schildbach |
| 2013/0301487 | A1 | 11/2013 | Khandani |
| 2013/0301488 | A1 | 11/2013 | Hong et al. |
| 2014/0126437 | A1 | 5/2014 | Patil et al. |
| 2014/0169236 | A1 | 6/2014 | Choi et al. |
| 2014/0206300 | A1 | 7/2014 | Hahn et al. |
| 2014/0219139 | A1 | 8/2014 | Choi et al. |
| 2014/0301379 | A1 | 10/2014 | Shoarinejad |
| 2014/0348018 | A1 | 11/2014 | Bharadia et al. |
| 2015/0091706 | A1* | 4/2015 | Chemishkian ..... G06K 7/10158 340/10.34 |
| 2015/0156003 | A1 | 6/2015 | Khandani |
| 2015/0156004 | A1 | 6/2015 | Khandani |
| 2016/0226653 | A1 | 8/2016 | Bharadia et al. |
| 2016/0234005 | A1 | 8/2016 | Hong et al. |
| 2016/0266245 | A1 | 9/2016 | Bharadia et al. |
| 2017/0090026 | A1 | 3/2017 | Joshi et al. |
| 2017/0264420 | A1 | 9/2017 | Bharadia et al. |

FOREIGN PATENT DOCUMENTS

| | | | | |
|---|---|---|---|---|
| EP | 2237434 | A1 | 10/2010 | |
| EP | 2267946 | A2 | 12/2010 | |
| JP | 2001-196994 | A | 7/2001 | |
| JP | 2004-56315 | A | 2/2004 | |
| RU | 2256985 | C2 | 7/2005 | |
| WO | WO 2009/106515 | A1 | 9/2009 | |
| WO | WO 2012/106262 | A1 | 8/2012 | |
| WO | WO 2012/106263 | A1 | 8/2012 | |
| WO | WO 2013/185106 | A1 | 12/2013 | |
| WO | WO 2014/093916 | A1 | 6/2014 | |
| WO | WO 2014/121290 | A1 | 8/2014 | |
| WO | WO 2015/021481 | A2 | 2/2015 | |
| WO | WO 2015/048678 | A1 | 4/2015 | |
| WO | WO 2015/073905 | A2 | 5/2015 | |
| WO | WO 2015/168700 | A1 | 11/2015 | |
| WO | WO 2017/132400 | * | 8/2017 | ............. G01S 13/82 |

OTHER PUBLICATIONS

Argenox, "A BLE Advertising Primer," 14 pages. [Retrieved from the Internet Nov. 13, 2017: <http://www.argenox.com/bluetooth-low-energy-ble-v4-0-development/library/a-ble-advertising-primer/>.

Bharadia, et al., "BackFi: High Throughput WiFi Backscatter," *Proceedings of the 2015 ACM Conference on Special Interest Group on Data Communication*, pp. 283-296, ACM, (2015). [Retrieved from the Internet Nov. 27, 2017: <https://web.stanford.edu/~skatti/pubs/sigcomm15-backfi.pdf>].

Bharadia, et al., "FastForward: Fast and Constructive Full Duplex Relays," *Proceedings of the 2014 ACM Conference on SIG-COMM*, pp. 199-210, ACM, (2014). [Retrieved via the Internet Nov. 28, 2017: <https://web.stanford.edu/~skatti/pubs/sigcomm14-ff.pdf>].

Bharadia, et al., "Full Duplex Mimo Radios," *Proceedings of the 11th USENIX Symposium on Networked Systems Design and Implementation (NSDI 14)*, pp. 359-372, USENIX Association, (2014). [Retrieved from the Internet Nov. 27, 2017: <https://www.usenix.org/system/files/conference/nsdi14/nsdi14-paper-bharadia.pdf>].

Buettner, et al., "An Empirical Study of UHF RFID Performance," *Proceedings of the 14th ACM International Conference on Mobile Computing and Networking*, ACM, 223-234, (2008). [Retrieved from the Internet Nov. 27, 2017: <http://citeseerx.ist.psu.edu/viewdoc/download?doi=10.1.1.163.4811&rep=rep1&type=pdf>].

Choi, et al., "Achieving Single Channel, Full Duplex Wireless Communication," *Proceedings of the 16th Annual International Conference on Mobile Computing and Networking*, pp. 1-12, ACM, (2010). [Retrieved via the Internet Nov. 27, 2017: <https://sing.stanford.edu/pubs/mobicom10-duplex.pdf>].

Ensworth, et al., "Every Smart Phone is a Backscatter Reader: Modulated Backscatter Compatibility with Bluetooth 4.0 Low Energy (BLE) Devices," 2015 IEEE International Conference on RFID, pp. 78-85, IEEE, (2015).

Ettus Research, "VERT2450 Antenna," 1 page. https://www.ettus.com/product/details/VERT2450. [Retrieved via the Internet Nov. 27, 2017: https://www.ettus.com/product/details/VERT2450].

Gollakota, et al., "The Emergence of RF-Powered Computing," *Computer*, 47(1):32-39, (2014). [Retrieved via the Internet Nov. 27, 2017: <http://citeseerx.ist.psu.edu/viewdoc/download?doi=10.1.1.472.5564&rep=rep1&type=pdf>].

Gummeson, et al., "Flit: A Bulk Transmission Protocol for RFID-Scale Sensors," *Proceedings of the 10th International Conference on Mobile Systems, Applications, and Services*, pp. 71-84, ACM, (2012). [Retrieved via the Internet Nov. 27, 2017: <https://web.stanford.edu/~pyzhang/papers/sys010fp-gummeson.pdf>].

Halperin, et al., "Tool Release: Gathering 802.11n Traces with Channel State Information," *ACM SIGCOMM Computer Communication Review*, 41(1):53, 2011. [Retrieved via the Internet Nov. 27, 2017: <http://www.sigcomm.org/sites/default/files/ccr/papers/2011/January/1925861-1925870.pdf>].

Hassanieh, et al., "Securing RFIDs by Randomizing the Modulation and Channel," *Proceedings of the 12th USENIX Symposium on Networked Systems Design and Implementation (NSDI '15)*, (2015). [Retrieved via the Internet Nov. 27, 2017: <https://www.usenix.org/system/files/conference/nsdi15/nsdi15-paper-hassanieh.pdf>].

Hu, et al., "Braidio: An Integrated Active-Passive Radio for Mobile Devices with Asymmetric Energy Budgets," *Proceedings of the 2016 Conference on ACM SIGCOMM 2016 Conference*, pp. 384-397, ACM, (2016). [Retrieved via the Internet Nov. 27, 2017: <https://people.cs.umass.edu/~dganesan/papers/Sigcomm16-Braidio.pdf>].

Hu, et al., "Laissez-Faire: Fully Asymmetric Backscatter Communication," *Proceedings of the 2015 ACM Conference on Special Interest Group on Data Communication*, pp. 255-267, ACM, (2015). [Retrieved via the Internet Nov. 27, 2017: <https://conferences.sigcomm.org/sigcomm/2015/pdf/papers/p255.pdf>].

Hu, et al., "Leveraging Interleaved Signal Edges for Concurrent Backscatter," *Proceedings of the 1st ACM Workshop on Hot Topics in Wireless*, pp. 13-18, ACM, (2014). [Retrieved via the Internet Nov. 27, 2017: <https://panhu.me/pdf/BST.pdf>].

Iyer, et al., "Inter-Technology Backscatter: Towards Internet Connectivity for Implanted Devices," *Proceedings of the 2016 Conference on ACM SIGCOMM 2016 Conference*, pp. 356-369, ACM (2016). [Retrieved via the Internet Nov. 27, 2017: <https://homes.cs.washington.edu/~gshyam/Papers/interscatter.pdf>].

Jain, et al., "Practical, Real-Time, Full Duplex Wireless," *Proceedings of the 17th Annual International Conference on Mobile Computing and Networking*, pp. 301-312, ACM, (2011). [Retrieved via the Internet Nov. 27, 2017: <https://web.stanford.edu/~skatti/pubs/mobicom11-duplex.pdf>].

Jain, et al., "Throughput Fairness Index: An Explanation," Technical Report, Department of CIS, The Ohio State University, 9 pages, (1999). [Retrieved via the Internet Nov. 27, 2017: <http://www.cse.wustl.edu/~jain/atmf/ftp/atm99-0045.pdf>].

Katti, et al., "Embracing Wireless Interference: Analog Network Coding," *ACM SIGCOMM Computer Communication Review*, 37(4):397-408, ACM, (2007). [Retrieved via the Internet Nov. 27, 2017: <https://homes.cs.washington.edu/~gshyam/Papers/anc.pdf>].

Katti, et al., "XORS in the Air: Practical Wireless Network Coding," *IEEE/ACM Transactions on Networking (ToN)*, 16(3):497-510, (2008), [Retrieved via the Internet Nov. 27, 2017: <http://citeseerx.ist.psu.edu/viewdoc/download?doi=10.1.1.212.6393&rep=rep1&type=pdf>].

Kellogg, et al., "Bringing Gesture Recognition to All Devices," *Proceedings of the 11th USENIX Symposium on Networked Systems Design and Implementation (NSDI '14)*, pp. 303-316, (2014). [Retrieved via the Internet Nov. 27, 2017: <https://www.usenix.org/system/files/conference/nsdi14/nsdi14-paper-kellogg.pdf>].

(56) References Cited

OTHER PUBLICATIONS

Kellogg, et al., "Passive Wi-Fi: Bringing Low Power to Wi-Fi Transmissions," *Proceedings of the 13th USENIX Symposium on Networked Systems Design and Implementation (NSDI '16)*, pp. 151-164, (2016). [Retrieved via the Internet Nov. 27, 2017: <https://www.usenix.org/system/files/conference/nsdi16/nsdi16-paper-kellogg.pdf>].
Kellogg, et al., "Wi-Fi Backscatter: Internet Connectivity for RF-Powered Device," *Proceedings of the 2014 ACM Conference on SIGCOMM*, pp. 607-618, ACM, (2014). [Retrieved via the Internet Nov. 27, 2017: <https://homes.cs.washington.edu/~gshyam/Papers/wifibackscatter.pdf>].
Liu, et al., "Ambient Backscatter: Wireless Communication Out of Thin Air" *ACM SIGCOMM Computer Communication Review*, 43:39-50, (2013). [Retrieved via the Internet Nov. 27, 2017: <http://abc.cs.washington.edu/files/comm153-liu.pdf>].
Liu, et al., "Enabling Instantaneous Feedback with Full-duplex Backscatter," *Proceedings of the 20th Annual International Conference on Mobile Computing and Networking*, pp. 67-78, ACM, (2014). [Retrieved via the Internet Nov. 27, 2017: <https://homes.cs.washington.edu/~gshyam/Papers/fullduplexbackscatter.pdf>].
Mango Communications, 802.11 Reference Design: PHY, 4 pages. [Retrieved via the Internet Nov. 27, 2017: <https://warpproject.org/trac/wiki/802.11/PHY>].
Ou, et al., "Come and Be Served: Parallel Decoding for COTS RFID Tags," *Proceedings of the 21st Annual International Conference on Mobile Computing and Networking*, ACM, pp. 500-511, (2015). [Retrieved via the Internet Nov. 27, 2017: <https://www.sigmobile.org/mobicom/2015/papers/p500-ouA.pdf>].
Parks, et al., "Turbocharging Ambient Backscatter Communication," *Proceedings of the 2014 ACM Conference on SIGCOMM*, pp. 619-630, ACM, (2014). [Retrieved via the Internet Nov. 27, 2017: <https://homes.cs.washington.edu/~gshyam/Papers/turbocharge.pdf>].
Patel, et al., "A review of wearable sensors and systems with application in rehabilitation," *Journal of Neuroengineering and Rehabilitation*, 9(1):21 (17 pages), (2012). [Retrieved via the Internet Nov. 27, 2017: <https://jneuroengrehab.biomedcentral.com/track/pdf/10.1186/1743-0003-9-21?site=jneuroengrehab.biomedcentral.com>].
Pletcher, "Ultra-Low Power Wake-Up Receivers for Wireless Sensor Networks," Ph.D. Dissertation, University of California Berkeley, 164 pages, (2008). [Retrieved via the Internet Nov. 27, 2017: <https://www2.eecs.berkeley.edu/Pubs/TechRpts/2008/EECS-2008-59.pdf>].
Talla, et al., "Hybrid Analog-Digital Backscatter: A New Approach for Battery-Free Sensing," 2013 IEEE International Conference on RFID, pp. 74-81, (2013).
Talla, et al., "Powering the Next Billion Devices with Wi-Fi," arXiv preprint arXiv: 1505.06815, (2015). [Retrieved via the Internet Nov. 27, 2017: <https://arxiv.org/pdf/1505.06815.pdf>].
Ti, Ti CC2541 radio, 3 pages. [Retrieved via the Internet Nov. 27, 2017: <http://www.ti.com/product/CC2541>].
Ti, Ti CC2650 radio, 3 pages. [Retrieved via the Internet Nov. 27, 2017: <http://www.ti.com/product/CC2650>].
Wang, et al., "Dude, Where's My Card?: RFID Positioning That Works with Multipath and Non-Line of Sight," *ACM SIGCOMM Computer Communication Review*, 43: 51-62, ACM, (2013). [Retrieved via the Internet Nov. 27, 2017: <http://citeseerx.ist.psu.edu/viewdoc/download?doi=10.1.1.594.4575&rep=rep1&type=pdf>].
Wang, et al., "Efficient and Reliable Low-Power Backscatter Networks," *Proceedings of the ACM SIGCOMM 2012 Conference on Applications, Technologies, Architectures, and Protocols for Computer Communication*, pp. 61-72, ACM, (2012). [Retrieved via the Internet Nov. 27, 2017: <http://haitham.ece.illinois.edu/Papers/sigcomm12-backscatter.pdf>].
Wang, et al., "Rf-Compass: Robot Object Manipulation Using RFIDs," *Proceedings of the 19th Annual International Conference on Mobile Computing & Networking (MobiCom '13)*, pp. 3-14, ACM, (2013). [Retrieved via the Internet Nov. 27, 2017: <https://dspace.mit.edu/openaccess-disseminate/1721.1/87045>].
Wang, et al., "RF-IDraw: Virtual Touch Screen in the Air Using RF Signals, " *Proceedings of the 2014 ACM conference on SIGCOMM*, pp. 235-246, (2014). [Retrieved via the Internet Nov. 27, 2017: <http://www.sigcomm.org/sites/default/files/ccr/papers/2014/August/2619239-2626330.pdf>].
Yang, et al., "Tagoram: Real-Time Tracking of Mobile RFID Tags to High Precision Using COTS Devices," *Proceedings of the 20th Annual International Conference on Mobile Computing and Networking*, ACM, 237-248, (2014). [Retrieved via the Internet Nov. 27, 2017: <http://citeseerx.ist.psu.edu/viewdoc/download?doi=10.1.1.431.5456&rep=rep1&type=pdf>].
Zhang, "FreeRider hardware and software source code," 2 pages, 2017 [Retrieved via the Internet Nov. 27, 2017: <https://github.com/pengyuzhang/FreeRider>].
Zhang, et al., "BLINK: A High Throughput Link Layer for Backscatter Communication," *Proceedings of the 10th International Conference on Mobile Systems, Applications, and Services*, pp. 99-112, ACM, (2012). [Retrieved via the Internet Nov. 27, 2017: <http://lass.cs.umass.edu/~gummeson/MobiSys12-BLINK.pdf>].
Zhang, et al., "EkhoNet: High Speed Ultra Low-power Backscatter for Next Generation Sensors," *Proceedings of the 20th Annual International Conference on Mobile Computing and Networking*, pp. 557-568, ACM, (2014). [Retrieved from the Internet Nov. 28, 2017: <https://people.cs.umass.edu/~dganesan/papers/Mobicom14-EkhoNet.pdf>].
Zhang, et al., "Enabling Bit-by-Bit Backscatter Communication in Severe Energy Harvesting Environments," *Proceedings of the 11th USENIX Symposium on Networked Systems Design and Implementation (NSDI '14)*, Berkeley, CA, (2014). [Retrieved via the Internet Nov. 27, 2017: <https://www.usenix.org/system/files/conference/nsdi14/nsdi14-paper-zhang.pdf>].
Zhang, et al., "Enabling Practical Backscatter Communication for On-body Sensors," *Proceedings of the 2016 conference on ACM SIGCOMM 2016 Conference*, pp. 370-383, ACM, (2016). [Retrieved via the Internet Nov. 27, 2017: <https://pdfs.semanticscholar.org/be77/7196c9fdf60c667d3e020b77b28223b5cd3b.pdf>].
Zhang, et al., "HitchHike: Practical Backscatter Using Commodity WiFi," SenSys '16, ACM, 13 pages, (2016). [Retrieved via the Internet Nov. 27, 2017: <https://web.stanford.edu/~pyzhang/papers/sensys16_back_comm.pdf>].
Zhang, et al., "QuarkOS: Pushing the operating limits of micro-powered sensors," *Proceedings of the 14th USENIX conference on Hot Topics in Operating Systems*, p. 7, USENIX Association, (2013). [Retrieved via the Internet Nov. 27, 2017: <https://www.usenix.org/system/files/conference/hotos13/hotos13-final19.pdf>].
Zhang, et al., "Enabling Backscatter Communication among commodity Wi-Fi Radios," Proceedings of the 2016 ACM SIGCOMMM Conference pp. 611-612; Aug. 22, 2016.
PCT International Search Report and Written Opinion of the International Searching Authority for application PCT/US2017/058371 dated Jan. 12, 2018.
U.S. Appl. No. 15/133,175, Notice of Allowance dated Nov. 28, 2018.
U.S. Appl. No. 15/033,889, Final Office Action dated Nov. 26, 2018.
Adib et al., "See Through Walls with Wi-Fi!," Proceedings of the ACM SIGCOMM 2013 conference on SIGCOMM, SIGCOMM '13, pp. 75-86, ACM, New York, NY, USA, (2013).
Adib, et al., "3D Tracking via Body Radio Reflections," Proceedings of the 11th USENIX Symposium on Networked Systems Design and Implementation, pp. 317-329, (2014).
Archer, et al., "Interface Contracts for TinyOS," IPSN '07: Proceedings of the 6th international conference on Information processing in sensor networks, pp. 158-165 (2007).
Aryafar, et al., "MIDU: Enabling MIMO Full Duplex," Proceedings of the 18th annual international conference on Mobile computing and networking, Mobicom '12, pp. 257-268, (2012).
Bahl, et al., "Reconsidering Wireless Systems With Multiple Radios," ACM SIG-COMM CCR, (2004).
Bahl, et al., "White Space Networking with Wi-Fi like Connectivity," SIGCOMM Comput. Commun. Rev., 39(4):27-38, (2009).

(56) References Cited

OTHER PUBLICATIONS

Bardwell, "Tech Report." [Retrieved from the Internet Dec. 3, 2016: <http://www.connect802.com/download/techpubs/2005/commercial_radios_E052315.pdf>].

Bharadia et al., "Full Duplex Radios," In Proceedings of the ACM SIGCOMM 2013 conference on SIGCOMM, SIGCOMM '13, pp. 375-386, ACM, New York, NY, USA, (2013).

Bharadia, "Full Duplex Backscatter," Proceedings of the 12th ACM Workshop on Hot Topics in Networks, 7 pages, ACM, (2013).

Bicket, "Bit-rate Selection in Wireless Networks," Master's thesis, MIT, 2005.

Bindu et al., "Active microwave imaging for breast cancer detection," Progress in Electromagnetics Research, vol. 58: 149-169, (2006).

Blefari-Melazzi, et al., "TCP Fairness Issues in IEEE 802.11 Networks: Problem Analysis and Solutions Based on Rate Control," IEEE Transactions on Wireless Communications, 6(4): 1346-1355 (2007).

Bliss, et al., "Simultaneous Transmission and Reception for Improved Wireless Network Performance," Proceedings of the 2007 IEEE Workshop on Statistical Signal Processing, (2007).

Bortz, et al., "The Simplex Gradient and Noisy Optimization Problems," North Carolina State University, Department of Mathematics, Center for Research in Scientific Computation, (1998).

Boyd, "Sequential Convex Programming." [Retrieved from the Internet Oct. 26, 2016: http://www.stanford.edu/class/ ee364b/lectures/seq_slides.pdf].

Boyd, Sequential Convex Programming, [Retrieved from the Internet May 8, 2017: <http://stanford.edu/class/ee364b/lectures/seq_slides.pdf>].

Briggs, et al., "Power Measurements of OFDM Signals," IEEE Symposium on Electromagnetic Compatibility, (2004).

Burlingame, et al., "An Analog CMOS High-Speed Continuous-Time FIR Filter," Solid-State Circuits Research Laboratory, Department of Electrical and Computer Engineering, University of California, Davis, CA, (2000).

Cavoukian, "Whole Body Imaging in Airport Scanners: Building in Privacy by Design," Information and Privacy Commissioner of Ontario, Mar. 2009. [Retrieved from the Internet Oct. 25, 2016: https://www.ipc.on.ca/wp-content/uploads/ . . . /wholebodyimaging.pdf].

Chandra, "A Case for Adapting Channel Width in Wireless Networks," ACM SIGCOMM, (2008).

Choi, et al., "Granting Silence to Avoid Wireless Collisions," Proceedings of the 18th International Conference on Network Protocols (ICNP), (2010).

Choi, et al., "IEEE 802.11e Contention-Based Channel Access (EDCF) Performance Evaluation," IEEE ICC (2003).

Choi, et al., "The Case for a Network Protocol Isolation Layer," Sensys '09: Proceedings of the 7th ACM Conference on Embedded networked sensor systems (SenSys), pp. 267-280, (2009).

Chu, et al., "The Design and Implementation of a Declarative Sensor Network System," Proceedings of the 5th international conference on Embedded networked sensor systems, (2007).

Coffman, et al., "Channel Fragmentation in Dynamic Spectrum Access Systems—a Theoretical Study," ACM SIGMETRICS, (2010).

Culler, et al., "Towards a Sensor Network Architecture: Lowering the Waistline," Proceedings of the Tenth Workshop on Hot Topics in Operating Systems (HotOS-X), (2005).

Ding, "Digital Predistortion of Power Amplifiers for Wireless Applications," Ph.D Thesis, School of Electrical and Computer Engineering, Georgia Institute of Technology, (Mar. 2004).

Duarte et al., "Experiment-driven Characterization of Full-Duplex Wireless Systems," (2011). [Retrieved from the Internet Oct. 25, 2016: https://arxiv.org/abs/1107.1276].

Duarte, "Experiment-driven Characterization of Full-Duplex Wireless Systems," CoRR, abs/1107.1276, (2011).

Duarte, et al., "Full-Duplex Wireless Communications Using Off-The-Shelf Radios: Feasibility and First Results," Forty-Fourth Asilomar Conference on Signals, Systems, and Components, (2010).

Ekanadham, "Continuous Basis Pursuit and Its Applications," PhD thesis, New York, NY, USA, AAI3546394, (2012).

Elhamifar et al., "Sparse Subspace Clustering: Algorithm, Theory, and Applications, IEEE Transactions on Pattern Analysis and Machine Intelligence," 35(11):2765-2781, (2013).

Erceg et al., "TGn channel models," Tech. Rep. IEEE P802.11, Wireless LANs, Garden Grove, Calif, USA, (2004).

Ettus Research, UHD Daughterboard Application Notes. [Retrieved from the Internet Dec. 8, 2016: <http://files.ettus.com/uhd_docs/manual/html/dboards.html>].

Ettus Research, Universal Software Radio Peripheral (USRP). [Retrieved from the Internet Dec. 3, 2016: <http://www.ettus.com>].

Everett, et al., "Empowering Full-Duplex Wireless Communication by Exploiting Directional Diversity," 2011 Conference Record of the Forty Fifth Asilomar Conference on Signals, Systems and Computers, pp. 2002-2006, (Nov. 2011).

Everett, et al., "Passive Self-Interference Suppression for Full-Duplex Infrastructure Nodes," CoRR, abs/1302.2185, (2013).

FCC, Table of Frequency Allocations. [Retrieved from the Internet Dec. 3, 2016: <http://transition.fcc.gov/oet/spectrum/table/fcctable.pdf>].

FDA, "Medical Imaging," [Retrieved from the Internet Oct. 25, 2016: http://www.fda.gov/Radiation-EmittingProducts/RadiationEmittingProductsandProcedures/MedicalImaging/MedicalX-Rays/ucm115317.htm].

Fear et al., "Confocal Microwave Imaging for Breast Cancer Detection: Localization of Tumors in Three Dimensions," IEEE Transactions on Biomedical Engineering, 49(8):812-822, (2002).

Fear et al., "Microwave Detection of Breast Cancer," IEEE Transactions on Microwave Theory and Techniques, 48(11):1854-1863, (2000).

Fear, et al., "Enhancing breast tumor detection with near-field imaging," Microwave Magazine, IEEE, 3(1):48-56, (2002).

Fleury et al., "Channel Parameter Estimation in Mobile Radio Environments Using the SAGE Algorithm," IEEE Journal on Selected Areas in Communications, 17(3):434-450, (1999).

Gember, et al., "A Comparative Study of Handheld and Non-Handheld Traffic in Campus Wi-Fi Networks," Passive and Active Measurement Conf., (2011).

Gheorma, et al., "Rf Photonic Techniques for Same Frequency Simultaneous Duplex Antenna Operation," IEEE Photonics Technology Letters, 19(13): 1014-1016, (2007).

Gill, Slide Presentation: "RF performance of mobile terminals—a challenge for the industry," Cambridge Wireless Radio Technology Special Interest Group (SIG), (2011).

Gizmodo, "IPhone 4 Antenna-Gate," (2011). [Retrieved from the Internet Dec. 3, 2016: <http://gizmodo.com/5846638/giz-explains-whats-so-smart-about-the-iphone-4ss-antenna>].

Gnawali, et al., "Collection Tree Protocol," Proceedings of the 7th ACM Conference on Embedded Networked Sensor Systems (SenSys), pp. 1-14 (2009).

Goldsmith, "Wireless Communications," Cambridge University Press, (2004).

Gollakota, et al., "They Can Hear Your Heartbeats: Non-Invasive Security for Implantable Medical Devices," SIGCOMM Comput. Commun. Rev., 41(4), (Aug. 2011).

Gollakota, et al., "ZigZag Decoding: Combating Hidden Terminals in Wireless Networks," SIGCOMM '08: Proceedings of the ACM SIGCOMM 2008 Conference on Data Communication, pp. 159-170, (2008).

Gummadi, et al., "Understanding and Mitigating the Impact of RF Interference on 802.11 Networks," Proceedings of the 2007 conference on Applications, technologies, architectures, and protocols for computer communications (SIGCOMM), (2007).

Guo et al., "Microwave Imaging via Adaptive Beamforming Methods for Breast Cancer Detection," Progress in Electromagnetics Research, vol. 1, 350-353, (2005).

Halperin, et al., "Taking the Sting out of Carrier Sense: Interference Cancellation for Wireless LANs." MobiCom '08: Proceedings of the 14th ACM international conference on Mobile computing and networking, pp. 339-350, (2008).

(56) References Cited

OTHER PUBLICATIONS

Harashima, "Matched-Transmission Technique for Channels With Intersymbol Interference," IEEE Transactions on Communications, COM-20:774-780, (1972).
Hong et al., "Picasso: Flexible RF and Spectrum Slicing," In Proceedings of the ACM SIGCOMM 2012 conference on Applications, technologies, architectures, and protocols for computer communication, SIGCOMM '12, pp. 283-284, ACM, Helsinki, Finland, (2012).
Hong, et al, "DOF: A Local Wireless Information Plane," ACM SIGCOMM, (2011).
Hua, et al., "A method for Broadband Full-Duplex Mimo Radio," IEEE Signal Processing Letters, 19(12):793-796, (Dec. 2012).
Huang, "Optimal Transmission Strategies for Dynamic Spectrum Access in Cognitive Radio Networks," IEEE Transactions on Mobile Computing, 8(12): 1636-1648, (2009).
Huyer, et al., "SNOBFIT—Stable Noisy Optimization by Branch and Fit," ACM Trans. Math. Softw., 35:9:1-9:25, (Jul. 2008).
Intersil Corp, "Qhx220 Active Isolation Enhancer and Interference Canceller." [Retrieved from the Internet Dec. 6, 2016: <http://www.intersil.com/content/dam/Intersil/documents/qhx2/qhx220.pdf].
Italian National Research Council, "Dielectric Properties of Body Tissues." [Retrieved from the Internet Oct. 25, 2016: http://niremf.ifac.cnr.it/tissprop/].
Iyer, et al., "Specnet: Spectrum Sensing Sans Frontiers," USENIX NSDI, (2011).
Jain et al., "Practical, Real-time, Full Duplex Wireless," MobiCom '11, pp. 301-312, ACM, New York, NY, USA, (2011).
Jamieson, et al., "PPR: Partial Packet Recovery for Wireless Networks," Proceedings of the 2007 conference on Applications, technologies, architectures, and protocols for computer communications (SIGCOMM), (2007).
Jiang, et al., "An Architecture for Energy Management in Wireless Sensor Networks," Proceedings of the International Workshop on Wireless Sensornet Architecture (WWSNA), (2007).
Joshi, et al, "Pinpoint: Localizing interfering radios," Proceedings of the 10th USENIX Conference on Networked Systems Design and Implementation, NSDI '13, pp. 241-254, (2013).
Jung, et al., "A Reconfigurable Carrier Leakage Canceler for UHF RFID Reader Front-Ends," IEEE Transactions on Circuits and Systems I: Regular Papers, 58(1):70-76, (Jan. 2011).
Khojastepour, et al., "The Case for Antenna Cancellation for Scalable Full Duplex Wireless Communications," ACM Hotnets, (2011).
Kim, et al., "Co-Channel Interference Cancellation Using Single Radio Frequency and Baseband Chain," IEEE Transactions on Communications, 58(7):2169-2175, (2010).
Kim, et al., "Flush: A Reliable Bulk Transport Protocol for Multihop Wireless Networks," In Proceedings of the Fifth ACM Conference on Embedded networked sensor systems (SenSys), (2007).
Klues, et al., "Integrating Concurrency Control and Energy Management in Device Drivers," Proceedings of twenty-first ACM SIGOPS symposium on Operating systems principles (SOSP), (2007).
Knox, "Single Antenna Full Duplex Communications using a Common Carrier," 2012 IEEE 13th Annual Wireless and Microwave Technology Conference (WAMICON), pp. 1-6, (2012).
Kuhn, "The Hungarian Method for the Assignment Problem," Naval Research Logistics Quarterly 2, 2:83-97, (1955). [Retrieved from the Internet May 8, 2017: <https://tom.host.cs.st-andrews.ac.uk/CS3052-CC/Practicals/Kuhn.pdf>].
Lakshminarayanan, et al., "Rfdump; An Architecture for Monitoring the Wireless Ether," ACM CoNEXT, (2009).
Lamprecht, et al., "Passive Alignment of Optical Elements in a Printed Circuit Board," Electric Components and Technology Conference, (2006).
Lee, et al., "Improving Wireless Simulation Through Noise Modeling," Proceedings of the 6th international conference on Information processing in sensor networks (IPSN), pp. 21-30, (2007).
Leith, et al., "TCP Fairness in 802.11e WLANs," IEEE Communications Letters, 9(12), (2005).
Levis, et al., "T2: A Second Generation OS for Embedded Sensor Networks," Technical Report TKN-05-007, Telecommunication Networks Group, Technische Universitat Berlin, (2005).
Liang, et al., "Sensing-Throughput Tradeoff for Cognitive Radio Networks," IEEE Transactions on Wireless Communications, 7(4): 1326-1337, (2008).
Liang, et al., "Surviving Wi-Fi Interference in Low Power Zigbee Networks," Proceedings of the Eighth ACM Conference on Embedded Networked Sensor Systems (SenSys), (2010).
Lin, et al., "Data Discovery and Dissemination with DIP," Proceedings of the 7th international conference on Information processing in sensor networks (IPSN), pp. 433-444, (2008).
Matheus, "Optimal Design of a Multicarrier Systems with Soft Impulse Shaping Including Equalization in Time or Frequency Direction," Global Telecommunications Conference, 1997, GLOBECOM '97, IEEE, vol. 1, pp. 310-314, (Nov. 1997).
Mattingly, et al., "CVXGEN: a code generator for embedded convex optimization," Optimization and Engineering, 13(1):1-27, (2012). [Retrieved from the Internet May 9, 2017: <http://stanford.edu/~boyd/papers/pdf/code_gen_impl.pdf].
Maxim Integrated, Power Amplifier Data-sheet. [Retrieved from the Internet Dec. 6, 2016: <http://datasheets.maximintegrated.com/en/ds/MAX2828-MAX2829.pdf>].
Mini-Circuits, Power Amplifier Data-sheet. [Retrieved from the Internet Dec. 6, 2016: <http://www.minicircuits.com/pdfs/PGA-105+.pdf>].
Mini-Circuits, Power Amplifier Data-sheet. [Retrieved from the Internet Dec. 6, 2016: <http://www.minicircuits.com/pdfs/ZHL-30W-262+.pdf>].
Morgan, et al, "A Generalized Memory Polynomial Model for Digital Predistortion of RF Power Amplifiers," IEEE Transactions on Signal Processing, 54(10):3852-3860, (2006).
National Instruments, N1 5781 Datasheet, (2011). [Retrieved from the Internet Dec. 6, 2016: <http://sine.ni.com/ds/app/doc/p/id/ds-212/lang/en>].
National Instruments, NI PXIe-8133 User Manual, (Jul. 2012). [Retrieved from the Internet Dec. 13, 2016: <www.ni.com/pdf/manuals/372870d.pdf>].
National Instruments, White Paper: "Understanding Dynamic Hardware Specifications," (Mar. 2010).
Palazzi, et al., "A RIO-Like Technique for Interactivity Loss-Avoidance in Fast-Paced Multiplayer Online Games," ACM Computers in Entertainment, (2005).
Peregrine Semiconductor, PE 47303 Data-sheet. [Retrieved from the Internet Dec. 6, 2016: <http://www.psemi.com/pdf/datasheets/pe43703ds.pdf>].
Polastre, et al., "A Unifying Link Abstraction for Wireless Sensor Networks," SenSys '05: Proceedings of the 3rd international conference on Embedded networked sensor systems, pp. 76-89, (2005).
Poston, et al., "Discontiguous OFDM Considerations for Dynamic Spectrum Access in Idle TV Channels," IEEE DySPAN, (2005).
Pu, et al., "Whole-Home Gesture Recognition Using Wireless Signals," Proceedings of the 19th Annual International Conference on Mobile Computing & Networking, MobiCom '13, pp. 27-38, (2013). [Retrieved from the Internet May 9, 2017: https://wisee.cs.washington.edu/wisee_paper.pdf].
Radunović, et al., "Efficiency and Fairness in Distributed Wireless Networks Through Self-Interference Cancellation and Scheduling," Technical Report MSR-TR-2009-27, Microsoft Research, (2009).
Radunović, et al., "Rethinking Indoor Wireless Mesh Design: Low Power, Low Frequency, Full-duplex," Fifth IEEE Workshop on Wireless Mesh Networks (WiMesh), pp. 1-6, (2010).
Rahul, et al., "Learning to Share: Narrowband-Friendly Wideband Networks," ACM SIGCOMM, (2008).
Ralston, et al., Real-time Through-wall Imaging Using an Ultrawideband Multiple-Input Multiple-Output (MIMO) Phased Array Radar System, 2010 IEEE Symposium on Phased Array Systems and Technology (ARRAY), pp. 551-558, (2010).
Remcom, "Modeling Indoor Propagation." [Retrieved from the Internet May 8, 2017: http://www.remcom.com/examples/modeling-indoor-propagation.html].
Rice University, WARP Project. [Retrieved from the Internet Dec. 8, 2016: <http://warp.rice.edu>].

(56) References Cited

OTHER PUBLICATIONS

Rohde & Schwarz, "Rohde & Schwarz FSW Signal and Spectrum Analyzer User Manual," (2016). [Retrieved from the Internet Dec. 10, 2016: <https://cdn.rohde-schwarz.com/pws/dl_downloads/dl_common_library/dl_manuals/gb_1/f/fsw_1/FSW_UserManual_en_26.pdf>].
Rohde & Schwarz, "Rohde & Schwarz SMBV 100A Signal Generator User Manual," (2016). [Retrieved from the Internet Dec. 6, 2016: <https://cdn.rohde-schwarz.com/pws/dl_downloads/dl_common_library/dl_manuals/gb_1/s/smbv/SMBV100A_OperatingManual_en_16.pdf>].
Sahai et al., "On the Impact of Phase Noise on Active Cancellation in Wireless Full-Duplex," (2012). [Retrieved from the Internet Oct. 25, 2016: https://arxiv.org/pdf/1212.5462].
Sahai, et al., "Spectrum Sensing: Fundamental limits," draft chapter for a Springer Book: Cognitive Radios: System Design Perspective, (Jun. 2009).
Sen, et al., "AccuRate: Constellation Based Rate Estimation in Wireless Networks," Proceedings of the Seventh USENIX Symposium on Networked Systems Design and Implementation (NSDI), (2010).
Sen, et al., "CSMA/CN: Carrier Sense Multiple Access with Collision Notification," Proceedings of the 16th annual international conference on Mobile computing and networking (MobiCom), pp. 25-36, (2010).
Shen, et al., "Channel Estimation in OFDM Systems," Application Note, Freescale Semiconductor, (2006).
Srinivasan, et al., "An Empirical Study of Low-Power Wireless," ACM Transactions on Sensor Networks, 6(2):1-49, (2010).
Srinivasan, et al., "RSSI is Under Appreciated," Proceedings of the Third Workshop on Embedded Networked Sensors (EmNets), (2006).
Srinivasan, et al., "Some Implications of Low Power Wireless to IP Networking," Proceedings of the Fifth Workshop on Hot Topics in Networks (HotNets-V), (Nov. 2006).
Srinivasan, et al., "The κ-Factor: Inferring Protocol Performance Using Inter-Link Reception Correlation," Proceedings of the 16th annual international conference on Mobile computing and networking (MobiCom), (2010).
Srinivasan, et al., The β-factor: Measuring Wireless Link Burstiness, Proceedings of the Sixth ACM Conference on Embedded Networked Sensor Systems, (Nov. 2008).
Sundstrom et al., "Power Dissipation Bounds for High-Speed Nyquist Analog-to-Digital Converters," IEEE Transactions on Circuits and Systems I: Regular Papers, 56(3):509-518, (2009).
Surowiec et al., "Dielectric Properties of Breast Carcinoma and the Surrounding Tissues," IEEE Transactions on Biomedical Engineering, 35(4):257-263, (1988).
Tan, et al., "Fine Grained Channel Access in Wireless LAN," ACM SIGCOMM, (2010).
Tan, et al., "Spectrum Virtualization Layer," MSR Tech Report, (2011). [Retrieved from the Internet Dec. 8, 2016: <http://research.microsoft.com/apps/pubs/default.aspx?id=154410>].
Tavakoli, et al., "A Declarative Sensornet Architecture," Proceedings of the International Workshop on Wireless Sensornet Architecture (WWSNA), (2007).
Tibshirani, "Regression shrinkage and selection via the lasso," Journal of the Royal Statistical Society, Series B (Methodological), pp. 267-288 (1996).
Tomlinson, "New Automatic Equaliser Employing Modulo Arithmetic," Electronic Letters, 7(5/6):138-139, (1971).
Tourrilhes, "Fragment Adaptive Reduction: Coping with Various interferers in radio unlicensed bands," IEEE IC, (2001).
Tse et al., "Fundamentals of Wireless Communications," Aug. 13, 2004. [Retrieved from the Internet Oct. 25, 2016: www.eecs.berkeley.edu/~dtse/main.pdf].
Van De Beek, et al., "On Channel Estimation in OFDM Systems," IEEE 45th Vehicular Technology Conference, vol. 2, pp. 815-819, (1995).
Vutukuru, et al., "Cross-Layer Wireless Bit Rate Adaption," SIGCOMM Comput. Commun. Rev., 39(4):3-14, (2009).

Weingarten, et al., "The Capacity Region of the Gaussian Multiple-Input Multiple-Output Broadcast Channel," IEEE Transactions on Information Theory, 52(9):3936-3964, (2006).
Welch, et al., "An Introduction to the Kalman Filter," Technical report, Chapel Hill, NC, USA, (2006). [Retrieved from the Internet May 9, 2017: <https://www.cs.unc.edu/~welch/media/pdf/kalman_intro.pdf>].
Wi-Fi Alliance, WiFi Direct Industry White Paper, (2010). [Retrieved from the Internet Dec. 13, 2016: <http://www.wi-fi.org/discover-wi-fi/wi-fi-direct>].
Wikipedia, "Star Trek Tricoder," [Retrieved from the Internet Oct. 26, 2016: http://en.wikipedia.org/wiki/Tricorder].
Winter, et al., "RPL: IPv6 Routing Protocol for Low power and Lossy Networks," IETF Internet draft (Work in Progress), (Jul. 2010). [Retrieved from the Internet Dec. 8, 2016: <https://tools.ietf.org/id/draft-ietf-roll-rpl-11.txt.>].
Wischik, et al., "Design, implementation and evaluation of congestion control for multipath TCP," USENIX NSDI, (2011).
Xilinx, DS249: LogiCore IP CORDIC v4.0 Data Sheet, (Mar. 1, 2011). [Retrieved from the Internet Dec. 3, 2016: <http://www.xilinx.com/support/documentation/ip_documentation/cordic_ds249.pdf>].
Xilinx, UG193: XtremeDSP User Guide, (Jan. 26, 2012). [Retrieved from the Internet Dec. 6, 2016: <https://www.xilinx.com/support/documentation/user_guides/ug193.pdf>].
Xiong et al., "ArrayTrack: A Fine-Grained Indoor Location System" In Proceedings of the 10th USENIX conference on Networked Systems Design and Implementation, nsdi'13, pp. 71-84, USENIX Association, Berkeley, CA, USA, (2013).
Yang, et al., "Supporting Demanding Wireless Applications with Frequency-agile Radios," USENIX NSDI, (2010).
Yang, et al., "The Spaces Between Us: Sensing and Maintaining Boundaries in Wireless Spectrum Access," ACM MOBICOM, (2010).
Yoo, et al., "On the Optimality of Multiantenna Broadcast Scheduling Using Zero-Forcing Beamforming," IEEE Journal on Selected Areas in Communications, 24(3):528-541, (2006).
Yuan, et al., "KNOWS: Kognitiv Networking Over White Spaces," IEEE DySPAN, (2007).
Zhang et al., "A novel method for microwave breast cancer detection," Progress in Electromagnetics Research, vol. 83: 413-434, (2008).
Zhang, et al., "Gain/Phase Imbalance-Minimization Techniques for LINC Transmitters," IEEE Transactions on Microwave Theory and Techniques, 49(12):2507-2516, (2001).
Chinese Application No. 201380041721.0, First Office Action dated Nov. 18, 2015.
EPO Application No. 20130801200, Supplementary European Search Report dated Feb. 4, 2016.
PCT International Preliminary Report on Patentability for application PCT/US2015/029105 dated Nov. 8, 2016.
PCT International Preliminary Report on Patentablility for application PCT/US2012/023183 dated Aug. 6, 2013.
PCT International Preliminary Report on Patentablility for application PCT/US2012/023184 dated Aug. 6, 2013.
PCT International Preliminary Report on Patentablility for application PCT/US2013/044830 dated Dec. 9, 2014.
PCT International Preliminary Report on Patentablility for application PCT/US2013/075166 dated Jun. 16, 2015.
PCT International Preliminary Report on Patentablility for application PCT/US2014/014726 dated Aug. 4, 2015.
PCT International Preliminary Report on Patentablility for application PCT/US2014/050584 dated Feb. 9, 2016.
PCT International Preliminary Report on Patentablility for application PCT/US2014/058117 dated Mar. 29, 2016.
PCT International Preliminary Report on Patentablility for application PCT/US2014/065814 dated May 17, 2016.
PCT International Search Report and Written Opinion of the International Searching Authority for application PCT/US2012/023183 dated May 17, 2012.
PCT International Search Report and Written Opinion of the International Searching Authority for application PCT/US2012/023184 dated May 7, 2012.

(56) References Cited

OTHER PUBLICATIONS

PCT International Search Report and Written Opinion of the International Searching Authority for application PCT/US2013/075166 dated Apr. 22, 2014.
PCT International Search Report and Written Opinion of the International Searching Authority for application PCT/US2014/014726 dated Jun. 2, 2014.
PCT International Search Report and Written Opinion of the International Searching Authority for application PCT/US2014/050584 dated Jan. 21, 2015.
PCT International Search Report and Written Opinion of the International Searching Authority for application PCT/US2014/058117 dated Dec. 30, 2014.
PCT International Search Report and Written Opinion of the International Searching Authority for application PCT/US2014/065814 dated Feb. 19, 2015.
PCT International Search Report and Written Opinion of the International Searching Authority for application PCT/US2015/029105 dated Jul. 27, 2015.
PCT International Search Report for application PCT/US2013/044830 dated Sep. 26, 2013.
PCT Written Opinion of the International Searching Authority for application PCT/US2013/044830 dated Sep. 26, 2013.
U.S. Appl. No. 13/293,069, Advisory Action dated Aug. 29, 2017.
U.S. Appl. No. 13/293,069, Final Office Action dated May 2, 2017.
U.S. Appl. No. 13/293,069, Final Office Action dated Jun. 8, 2016.
U.S. Appl. No. 13/293,069, Final Office Action dated Oct. 21, 2014.
U.S. Appl. No. 13/293,069, Non-Final Office Action dated Jan. 6, 2017.
U.S. Appl. No. 13/293,069, Non-Final Office Action dated May 1, 2014.
U.S. Appl. No. 13/293,069, Non-Final Office Action dated Jul. 17, 2013.
U.S. Appl. No. 13/293,069, Non-Final Office Action dated Sep. 21, 2015.
U.S. Appl. No. 13/293,069, Notice of Allowance dated Sep. 27, 2017.
U.S. Appl. No. 13/293,069, Notice of Allowance dated Oct. 6, 2017.
U.S. Appl. No. 13/293,072, Applicant Initiated Interview Summary dated Aug. 7, 2018.
U.S. Appl. No. 13/293,072, Final Office Action dated Mar. 15, 2016.
U.S. Appl. No. 13/293,072, Final Office Action dated Apr. 5, 2018.
U.S. Appl. No. 13/293,072, Final Office Action dated Aug. 3, 2017.
U.S. Appl. No. 13/293,072, Final Office Action dated Mar. 31, 2014.
U.S. Appl. No. 13/293,072, Non-Final Office Action dated Jan. 13, 2017.
U.S. Appl. No. 13/293,072, Non-Final Office Action dated Jul. 17, 2015.
U.S. Appl. No. 13/293,072, Non-Final Office Action dated Jul. 19, 2013.
U.S. Appl. No. 13/293,072, Notice of Allowance dated Oct. 17, 2018.
U.S. Appl. No. 13/762,043, Final Office Action dated Jun. 8, 2015.
U.S. Appl. No. 13/762,043, Non-Final Office Action dated Nov. 17, 2014.
U.S. Appl. No. 13/762,043, Notice of Allowance dated Nov. 9, 2015.
U.S. Appl. No. 13/913,323, Final Office Action dated Apr. 21, 2015.
U.S. Appl. No. 13/913,323, Non-Final Office Action dated Mar. 12, 2015.
U.S. Appl. No. 13/913,323, Notice of Allowance dated Feb. 12, 2016.
U.S. Appl. No. 13/913,323, Notice of Allowance dated Oct. 16, 2015.
U.S. Appl. No. 13/913,323, Notice of Allowance dated Nov. 5, 2015.
U.S. Appl. No. 13/913,323, Notice of Allowance dated Nov. 13, 2015.
U.S. Appl. No. 14/456,807, Non-Final Office Action dated Mar. 4, 2016.
U.S. Appl. No. 14/456,807, Non-Final Office Action dated Sep. 21, 2018.
U.S. Appl. No. 14/456,807, Non-Final Office Action dated Oct. 25, 2017.
U.S. Appl. No. 14/456,807, Notice of Allowance dated Jun. 6, 2018.
U.S. Appl. No. 15/025,256, Non-Final Office Action dated Oct. 19, 2017.
U.S. Appl. No. 15/025,256, Notice of Allowance dated May 21, 2018.
U.S. Appl. No. 15/025,256, Notice of Allowance dated Sep. 13, 2018.
U.S. Appl. No. 15/033,889, Non-Final Office Action dated Apr. 27, 2018.
U.S. Appl. No. 15/133,175, Final Office Action dated May 10, 2018.
U.S. Appl. No. 15/133,175, Non-Final Office Action dated Sep. 21, 2017.
U.S. Appl. No. 13/293,072, Notice of Allowance dated Dec. 27, 2018.
U.S. Appl. No. 15/025,256, Notice of Allowance dated Jan. 3, 2019.
U.S. Appl. No. 14/456,807, Notice of Allowance dated Mar. 1, 2019.

* cited by examiner

BACKSCATTER COMMUNICATION AMONG COMMODITY WIFI RADIOS

CROSS REFERENCE TO RELATED APPLICATIONS

The present application claims benefit under 35 USC 119(e) of Application Ser. No. 62/374,703, filed Aug. 12, 2016, the contents of which is incorporated herein by reference in their entirety.

FIELD OF THE INVENTION

The present invention relates to communication systems and methods, and more particularly to a low power WiFi backscattering communication system and method.

BACKGROUND OF THE INVENTION

Backscatter communication has attracted interest for applications such as implantable sensors, wearables, and smart home sensing because of its ability to offer low power connectivity to these sensors. Such applications have severe power constraints. Implantable sensors for example have to last for years, while even more traditional smart home monitoring applications may benefit from sensors and actuators that can last several years. Backscatter communication can satisfy the connectivity requirements while consuming such low power as to be energized by harvesting energy, or with batteries that could last several years.

Current backscatter systems require specialized hardware to generate the excitation RF signals that backscatter radios can reflect, as well as to decode the backscattered signals. Recent research such as Wi-Fi backscatter to BackFi and passive WiFi have reduced the need for specialized hardware. Passive WiFi for example can decode using standard WiFi radios, however it still requires a dedicated continuous wave signal generator as the excitation RF signal source. BackFi needs a proprietary full duplex hardware add-on to WiFi radios to enable backscatter communication. Consequently, a need continues to exist for a backscatter system that can be deployed using commodity devices such as access points, smartphones, watches and tablets.

BRIEF SUMMARY OF THE INVENTION

A backscatter tag communicate device, in accordance with one embodiment of the present invention includes, in part, a receiver configured to receive a WiFi packet conforming to a communication protocol defining a multitude of codewords, a mapper configured to map at least a first subset of the multitude of codewords disposed in the packet to a second multitude of codewords defined by the protocol, and a frequency shifter configured to shift a frequency of the second multitude of codewords such that the frequency shifted codewords are characterized by a single sideband spectrum. In one embodiment, the communication protocol is the 802.11b communication protocol.

In one embodiment, the mapper is further configured to map the at least first subset of the multitude of codewords by changing phases of the at least first subset of the multitude of codewords. In one embodiment, the backscatter tag communication device further includes, in part, a first signal splitter configured to split a WiFi signal representative of the WiFi packet into first and second signals.

In one embodiment, the backscatter tag communication device further includes, in part, a first on-off keying block disposed in a first path and adapted to receive the first signal, and a second on-off keying block disposed in a second path and adapted to receive the second signal.

In one embodiment, the backscatter tag communication device further includes, in part, a delay element adapted to delay the first signal to generate a third signal. In one embodiment, the backscatter tag communication device further includes, in part, a coupler configured to receive an output of the first on-off keying block, receive a delayed output of the second on-off keying block, shift a phase of the delayed output of the second on-off keying block, and combine the output of the first on-off keying block with the phase-shifted delayed output of the second on-off-keying block. The combined output represents the single sideband signal of the backscatter tag communication device.

In one embodiment, the backscatter tag communication device further includes, in part, a second signal splitter adapted to receive the WiFi signal from a receive antenna supply the received WiFi signal to the first signal splitter, and a signal integrator adapted to integrate the WiFi signal received from the receive antenna and deliver the integrated signal to a control logic.

In one embodiment, the backscatter tag communication device further includes, in part, a multiplexer configure to select between an oscillating signal or a delayed replica of the oscillating signal in response to a select signal the multiplexer receives from the control logic. In one embodiment, the multiplexer is further configure to deliver the selected signal to the control logic A method of communication via a backscatter tag, in accordance with one embodiment of the present invention includes, in part, receiving a packet conforming to a WiFi communication protocol defining a multitude of codewords, mapping at least a first subset of the multitude of codewords disposed in the packet to a second multitude of codewords defined by the protocol, and shifting a frequency of the second multitude of codewords such that the frequency shifted codewords are characterized by a single sideband spectrum. In one embodiment, the communication protocol is the 802.11b communication protocol.

In one embodiment, the method further includes, in part, mapping the at least first subset of the multitude of codewords to a second multitude of codewords by changing phases of the at least first subset of the multitude of codewords. In one embodiment, the method further includes, in part, splitting a WiFi signal representative of the WiFi packet into first and second signals using a first signal splitter.

In one embodiment, the method further includes, in part, supplying the first signal to a first on-off keying block disposed in a first path, and supplying the second signal to a second on-off keying block disposed in a second path. In one embodiment, the method further includes, in part, delaying the first signal to generate a third signal.

In one embodiment, the method further includes, in part, receiving an output of the first on-off keying block, receiving a delayed output of the second on-off keying block, shifting a phase of the delayed output of the second on-off keying block, and combining the output of the first on-off keying block with the phase-shifted delayed output of the second on-off-keying block to generate the single sideband signal at the output of the backscatter tag.

In one embodiment, the method further includes, in part, splitting the received WiFi signal from a receive antenna using a second splitter, supplying the signal split by the second splitter to the first signal splitter, integrating the WiFi signal received from the receive antenna, and delivering the integrated signal to a control logic. In one embodiment, the method further includes, in part, selecting between an oscillating signal or a delayed replica of the oscillating signal in response to control signal supplied by the control logic. In one embodiment, the method further includes, in part, delivering the selected signal to the control logic.

DETAILED DESCRIPTION OF THE INVENTION

Figure 1:
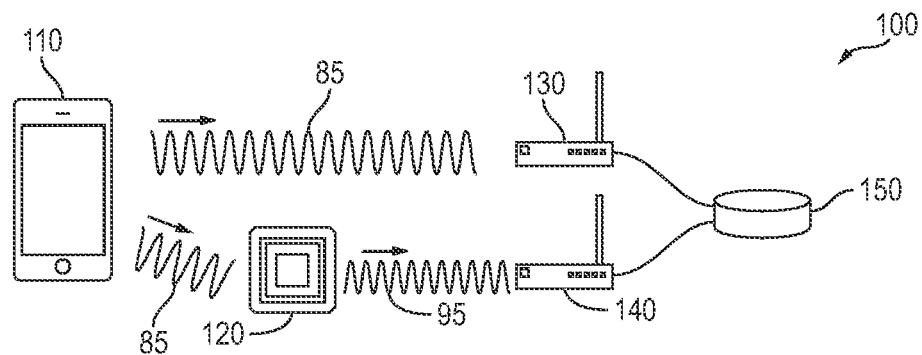
FIG. 1 is a simplified view of a backscatter communication system in accordance with one embodiment of the present invention.

Embodiments of the present invention provide a system and method of communication that is complaint with an existing communications protocol, such as WiFi 802.11b, by backscattering another WiFi compliant packet and modulating its data on the resulting packet by codeword translation. According to some embodiments, applications can be built on existing wireless devices carrying 802.11b packets. A low-power backscatter communications system (hereinafter alternatively referred to as XoRFi, backscatter tag, or tag) is configured, in part, to receive a valid codeword disposed in the transmitted, for example, 802.11b packet and translate it to a different valid codeword from the, for example, 802.11b codebook. The specific translation encodes the bit that the backscatter tag seeks to transmit. The backscattered packet is therefore like any other 802.11b packet, albeit with a sequence of translated codewords depending on the data that backscatter tag seeks to communicate. Consequently it can be decoded by any standard 802.11b receiver. The following description of the embodiments of the present invention is provided with reference to 802.11b communications protocol or standards. It is understood however that embodiments of the present invention are equally applicable to many other communication protocols.

Realizing codewords translation, decoding and recovering the backscattered signals pose a number of challenges. One challenge is the additional hardware and power consumption introduced by a conventional backscattering communication system. Another challenge is the signal-to-noise ratio (SNR) inherent from the original transmitted signal co-existing in the resultant signals. If the backscatter tag simply reflects the transmitted 802.11b packet, the receiver cannot likely decode the backscattered packet since it is received simultaneously on the same channel as the original transmission. This leads to strong self-interference from the original 802.11b transmission that can cause decoding failure. To tackle this challenge, in accordance with one embodiment of the present invention, frequency shifting is performed such that the backscattered packet is shifted and transmitted on an adjacent non-overlapping WiFi channel. However such frequency shifting techniques generates two sidebands, one of which is the desired adjacent channel backscatter transmission whereas the other is an unwanted and wasted sideband that can interference. In accordance with another embodiment of the present invention, the unwanted sideband is suppressed.

FIG. 1 is a simplified view of a backscatter communication system 100 according to an embodiment of the present invention. In the description below it is assumed that excitation device 110 transmits 802.11b compliant WiFi packets that backscatter tag 120 and access points 130 and 140 are adapted to operate with. It is understood that the embodiments of the present invention are no so limited and that a backscatter communication system, in accordance with embodiments of the present invention, may operate with other similar communication standards. Therefore, although the following description of the invention is provided with reference to the 802.11b communication protocol, it is understood that the embodiments of the present invention are applicable to any other communication protocol.

Excitation device 119 is shown as being a mobile phone with a standard WiFi radio but it is understood that any other device configured to communicate via a WiFi radio may be used. Mobile phone 110 is shown as transmitting an 802.11b packet 85 to WiFi Access Point (AP) 130—which is listening on the original channel established between mobile phone 110 and access point 130—configured to recognize and process the 802.11b packets. Backscatter tag 120, in accordance with embodiments of the present invention, also receives packets 85 transmitted by mobile phone 110 and implements codeword translation, as described below, and further shifts the frequency of the backscatter signal to another channel, thereby to generate and transmit backscattered packets 95. In other words, packets 95 remain compatible with the 802.11b standard but are transmitted with a frequency that is different from the transmission frequency of packets 85. AP 140 is configured to listen in on and thus receive packets transmitted at the frequency shifted channel. AP 140 is hence adapted to receive and process packets 95. Both AP 130 and AP 140 transmit the packets they process to XOR block 150. In response, XOR block 150 compares the two packers to recover the data placed by backscatter tag 120 onto packet 95, i.e. the backscatter packets. Therefore, in accordance with embodiments of the present invention, backscatter tag 120 is configure to send data by placing them on the packets generated by mobile device 110. In embodiments where only one AP is available, mobile device 110 can transmit a known 802.11b packet (e.g. a packet of all 1s). Thereafter, any WiFi radio receiving the backscattered packet can XOR that packet with the known 802.11b packet and recover the backscatter data.

As is known, an 802.11b radio uses a finite set of codewords to encode packets. For example, the 1 Mbps 802.11b transmission uses only two code-words, $code_0$ and $code_1$, as shown in equation 1. Data zero and one are encoded as $code_0$ and $code_1$ respectively. The only difference between the two codewords is a 180° phase offset, which indicates whether a zero or a one is being transmitted. The barker code used by the two codewords is a sequence similar to the PN sequence used in the CDMA system. It is designed to significantly increase the SNR at the decoder. For example, 802.11b decoder can decode 1 Mbps at −95 dBm.

$$code_0 = barker$$

$$code_1 = barker \times e^{j\pi} \qquad (1)$$

Instead of using only two codewords, 2 Mbps 802.11b uses four codewords in its codebook to encode packets as shown in equation 2. Data 00, 01, 11, and 10 are encoded as $code_0$, $code_1$, $code_2$, and $code_3$ respectively. The data are embedded in the phase of the codewords, as shown below:

$$code_0 = barker$$

$$code_1 = barker \times e^{j\pi/2}$$

$$code_2 = barker \times e^{j\pi}$$

$$code_1 = barker \times e^{j3\pi/2} \qquad (2)$$

As is known, the 5.5 Mbps and 11 Mbps CCK transmission protocols use a larger set of codewords compared to the 1 Mbps and 2 Mbps transmission protocols. Equation 3 shows the codewords used by the 5.5 Mbps transmission protocol. To transmit at 5.5 Mbps, CCK divides the bit stream into blocks of four bits. The first two bits are used to determine the phase θ of the codeword, which varies among 0, $$\frac{\pi}{2},$$

π, and $$\frac{3\pi}{2}.$$

The last two bits are used to choose one of the four barker codes. The 11 Mbps CCK transmission protocol uses a similar technique where the data stream is divided into blocks of 8 bits. The first two bits are used to select the phase, and the last six bits are used to choose one of the 64 Barker codes.

$$code_0 = barker_0 \times e^{j\theta_0}$$

. . . .

$$code_{15} = barker_{15} \times e^{j\theta_{15}} \qquad (3)$$

In other words, the 802.11b WiFi communication protocol uses a finite set of codewords to encode packets. A backscatter system, in accordance with embodiments of the present invention, leverages the fact that only a finite set of codewords are used. Since a backscatter tag, in accordance with embodiments of the present invention, is configured to translate the codeword $code_i$ used by the 802.11b transmitter to another codeword $code_j$ within the same set, then any 802.11b receiver can decode the backscattered packet.

As described above, in accordance with one aspect of the present invention, code-word translation or mapping is performed. Conceptually, any modulation scheme (including the modulation schemes used in WiFi) is a mapping between bits and codewords from a discrete codebook. Decoding is the inverse operation which involves mapping from a received codeword to the actual bit. For a commodity WiFi receiver to decode the backscattered packet, its codewords need to come from the same codebook as WiFi's. In other words, if the backscatter tag can act as a codeword translator or mapper (i.e. translate or map the codewords from the original 802.11b packet to other codewords in the 802.11b codebook) then a standard 802.11b receiver will be able to decode the packet, and a standard 802.11b transmitter can transmit original data. For example, equation 4 below shows how the codeword for 1 and codeword for 0 are related; in other words codeword 0 can be translated into codeword 1. Therefore, translation or mapping is performed in accordance with the bits the backscatter tag decides to transmit and such that the 802.11b receiver can recover the applied translation/mapping and therefore recover the bits transmitted by the backscatter tag:

$$\text{codeword } 0 = 1 \times barker$$

$$\text{codeword } 1 = -1 \times barker = \text{codeword } 0 \times e^{j\pi} \qquad (4)$$

For backscattering 802.11b 1 Mbps signals, the backscatter tag implements a simple translation. To backscatter bit zero, the backscatter tag may perform no translation and simply reflect the original codeword. To backscatter bit one, the backscatter tag may translate the received codeword to the only other valid codeword in the 802.11b 1 Mbps codebook. To do so, the backscatter tag may simply shift the phase of the received codeword by 180 degrees as shown in equation 5 below. Therefore, if the original 802.11b bit is a 0, a 1 is backscattered. Conversely, if the original 802.11b bit is a 1, a 0 is backscattered. Further description of how the tag implements the codeword translation/mapping is provided below.

Tag data 0=802.11b data

Tag data 1=802.11b data×$e^{j\pi}$ (5)

XOR Decoder

The 802.11b receiver, in accordance with embodiments of the present invention, may decode the backscattered packets since all the codewords are valid codewords from the 802.11b 1 Mbps codebook. However, to recover the bits that the backscatter tag transmitted, the receiver needs to be aware of the translations that were applied to the original 802.11b bits by the backscatter tag.

As described below, the recovery of the data generated by the translation/mapping is equivalent to performing an XOR operation of the decoded packet with the original 802.11b packet. If the original bit is a 1 and the backscatter tag wants to send a 1, then a translation was applied. This amounts to phase shifting by 180 degrees twice (once at the transmitter and again at the backscatter tag), thus resulting into backscattering of codeword corresponding to a 0. If the original bit is 1 and the tag wants to send 0, then no translation is applied (no phase shift), resulting in backscattering of a 1. The other two combinations are shown in Table 1 below:

TABLE I

| Decoded bit | 802.11b bit | Backscatter bit |
|---|---|---|
| 1 | 1 | 0 |
| 1 | 0 | 1 |
| 0 | 1 | 1 |
| 0 | 0 | 0 |

As is seen, the decoded bit is a logic XOR operation of the original 802.11 bit with the backscatter bit, as is also shown in equation 6 below:

decoded data=original data(XOR)backscatter data (6)

Hence, to recover the backscatter bits, the receiver simply has to invert the XOR with original 802.11b packet. To do so however, it needs to know the original 802.11b packet. Assume that the backscatter tag is deployed in a setting similar to that shown in FIG. 1, where mobile phone 110 transmits the original 802.11b packet to WiFi AP 130 listening on the Channel 1 (established between the mobile phone 110 and WiFi AP 130.) The backscatter tag implements codeword translation, as described above, and shifts the backscatter signal frequency to a different channel, e.g. channel 6. The backscattered packet is decoded by AP 140 which is listening on e.g., channel 6. AP 140 sends the decoded backscattered packet to XOR block 150 which then implements the XOR operation to recover the backscattered bits from the tag.

It is understood that the same concept of codeword translation may be applied to any of the 802.11b transmissions rates up to, for example, 2 Mbps since similar codeword translation may be implemented for other transmission rates by phase shifting techniques. Accordingly, the 802.11b WiFi protocol uses a finite set of codewords to encode packets. The backscatter tag leverages the fact that only a finite set of codewords are used. Because the tag can translate the codeword code$_i$ used by the 802.11b transmitter to another codeword code$_1$ within the same set, any 802.11b receiver can decode the backscattered packet, in accordance with embodiments of the present invention.

Frequency Shifting

Figure 2:
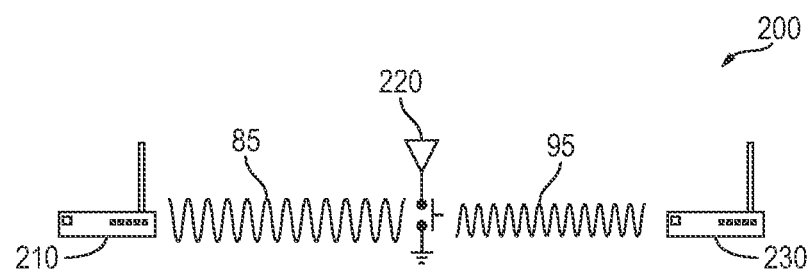
FIG. 2 is a simplified view of a backscatter tag communication system, in accordance with one embodiment of the present invention.

FIG. 2 shows, in part, a backscatter tag 220 according to an embodiment of the present invention. A commodity WiFi radio 210 transmits an 802.11b WiFi packet 85 that is shown as being received by backscatter tag 220. In response, backscatter tag retransmits packet 95 to another 802.11b WiFi radio receiver 230 after translating/mapping the codeword and shifting the frequency of the packet to an adjacent WiFi channel/frequency. The 802.11b receiver 230 listening in on the adjacent WiFi channel receives the WiFi packet retransmitted by backscatter tag 220, decodes the packet using the normal WiFi decoding technique, and then extracts the backscattered information from the decoded bit stream.

Figure 3:
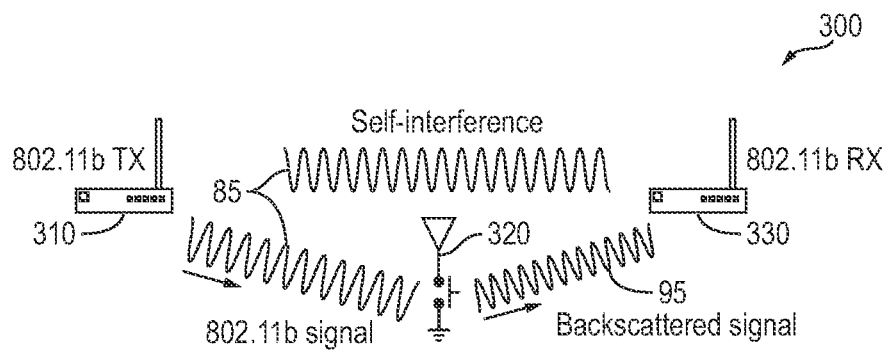
FIG. 3 is a simplified view of a backscatter tag communication system that uses a single AP receiver, in accordance with one embodiment of the present invention.

FIG. 3 shows a backscatter tag communications system 300 that uses a single AP receiver 330. Backscatter tag 320 is configured to map/translate code words between 802.11b transmitter 310 and 802.11b receiver 330, as described above. When AP receiver 330 receives the backscattered signal, it also receives the signal from the transmitter 310. This 802.11b signal acts as a strong interference because it shares the same frequency band as the backscattered signal and is usually ~30 dB higher than the backscattered signal, thereby compounding the interference problem.

Figure 4:
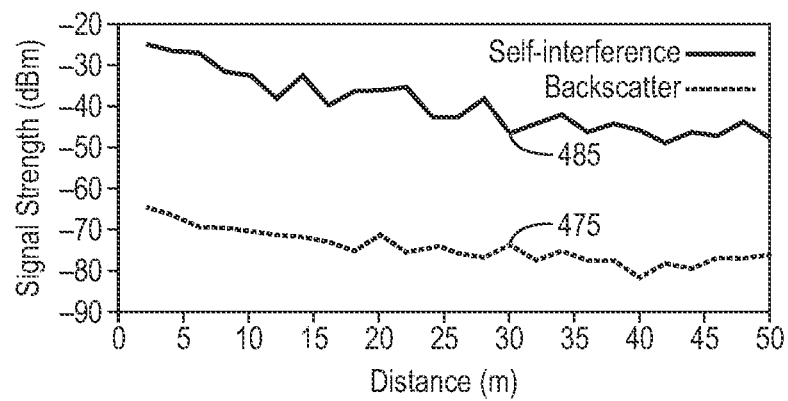
FIG. 4 is a plot of the strength of a self-interference signal and a backscattered signal, according to one experimental set up, as a function of the distance between the backscatter tag and the AP receiver shown in FIG. 3.

FIG. 4 is a plot of the strength of self-interference signal 485 and backscattered signal 475, according to one experimental set up, as a function of the distance between the backscatter tag and the AP receiver as shown in FIG. 3. As is seen, for example, at 10 m the self-interference is 40 dB higher than the backscattered signal, thus making the backscattered signal difficult to decode.

A conventional technique for mitigating this problem is a full-duplex communication technique. However, this technique requires hardware modification on existing 802.11b radios, which is not desirable. Embodiments of the present invention avoid the self-interference problem by enabling the backscatter tag to frequency shift the backscattered signal to an adjacent, non-overlapping WiFi channel. However a non-overlapping WiFi channel does not imply absence of self-interference because the WiFi transmission also emits energy in adjacent channels.

Figure 5:
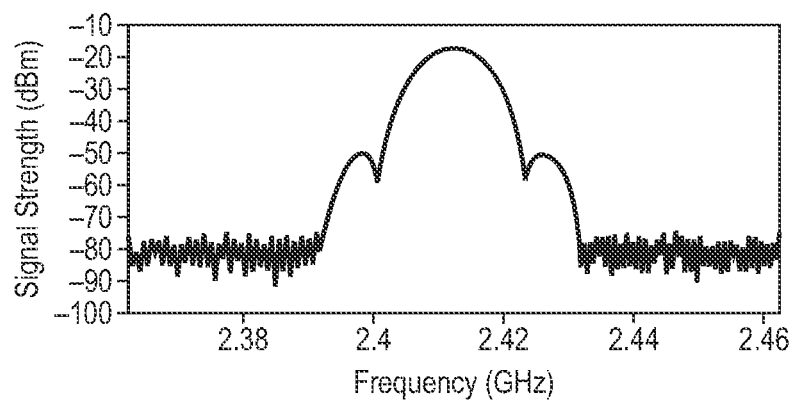
FIG. 5 is a plot of a measured 802.11b transmission spectrum empirically acquired.

FIG. 5 is a plot of a measured 802.11b transmission spectrum empirically acquired. The plot shows that there is signal leakage into the adjacent band at nearly 11 MHz away from the center of the channel being a 30 dB smaller in magnitude. The leaked signal strength degrades further away from the center. For example, there is 50 dB signal degradation at 22 MHz away from the center.

To implement frequency shifting, a tag backscatter in accordance with the present invention, multiplies the 802.11b incident signal $S_{802.11b}$ with a square wave generated by the tag as $S_{802.11b} \times S_{tag}$. When the frequency of the 802.11b incident signal is $f_c$ and the tag square wave frequency is $f_t$, the backscattered signal is shifted to the $f_c \pm f_t$ band, which is $f_t$ away from the original 802.11b signal. In one implementation, the tag generates a square wave at 30 MHz in order to move the backscattered signal 30 MHz away from the incident 802.11b signal.

Generating Single Side-Band Backscatter

Figure 6:
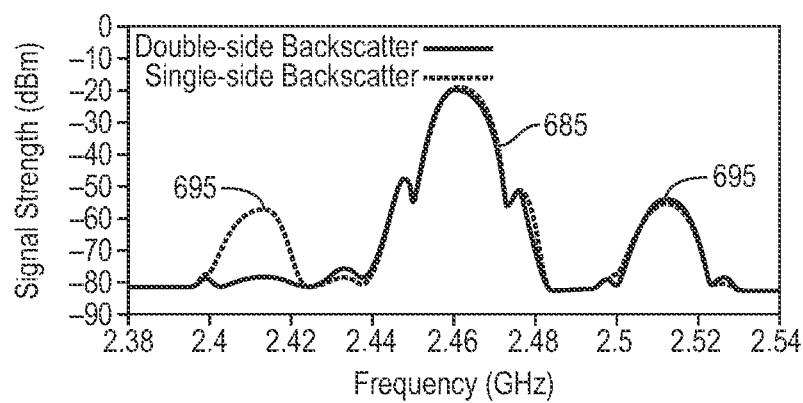
FIG. 6 shown the strength of an 802.11b signal obtained using a simple frequency shifting technique.

A simple frequency shifting technique generates copies of the 802.11b signal on both sides 695 of the main lobe 685 of the signal shown in FIG. 6. In this measurement, an 802.11b transmitter was used to transmit with a central frequency of 2.462 GHz. The backscatter tag shifts the backscattered signal 50 MHz away from the 802.11b signal. Such frequency shifting generates copies on both 2.462 GHz±50 MHz. Such double sided backscatter signal generates unwanted interference in the other band. A backscatter tag, in accordance with embodiments of the present invention, generates a single side band backscatter signal with its data only on that single side.

When the backscatter tag toggles the RF switch at $f_t$ frequency, it uses a square wave $S_{tag}(f_t t)$ to modulate the incident 802.11b signal, which is a multiplication operation. The square wave signal can be presented using Fourier series as shown in equation 7 below:

$$S_{tag}(f_t t) = \frac{4}{\pi} \sum_{n=1,3,5,\ldots \text{ odd}}^{\infty} \frac{1}{n} \sin(2\pi f_t t)$$

In equation (8) shown below, the 802.11b signal received at the backscatter tag is represented by $S_{802.11b}$, and the signal backscattered by the tag is represented by r(t). From equation 8, sidebands may be seen on both sides of the spectrum $\cos(2\pi(f_c - nf_t)t)$ and $\cos(2\pi(f_c + nf_t)t)$ with center frequencies $f_c + nf_t$ and $f_c - nf_t$ present in the backscatter signal. In accordance with embodiments of the present invention, the unwanted sideband signal is eliminated, as described further below.

$$\begin{aligned}
r(t) &= S_{802.11b} \times S_{tag}(f_t t) \\
&= \sin(2\pi f_c t) \times S_{tag}(f_t t) \\
&= \frac{4}{\pi} \sum_{n=1,3,5,\ldots \text{ odd}}^{\infty} \frac{1}{n} \sin(2\pi f_c t) \times \sin(2\pi n f_t t) \\
&= \frac{2}{\pi} \sum_{n=1,3,5,\ldots \text{ odd}}^{\infty} \frac{1}{n} \{\cos(2\pi(f_c - nf_t)t) - \cos((2\pi(f_c + nf_t)t)\}
\end{aligned} \quad (8)$$

In other words, in accordance with one aspect of the present invention, single side band backscatter signal is achieved, while having low power consumption and introducing negligible loss on the backscattered signal strength.

Figure 7:
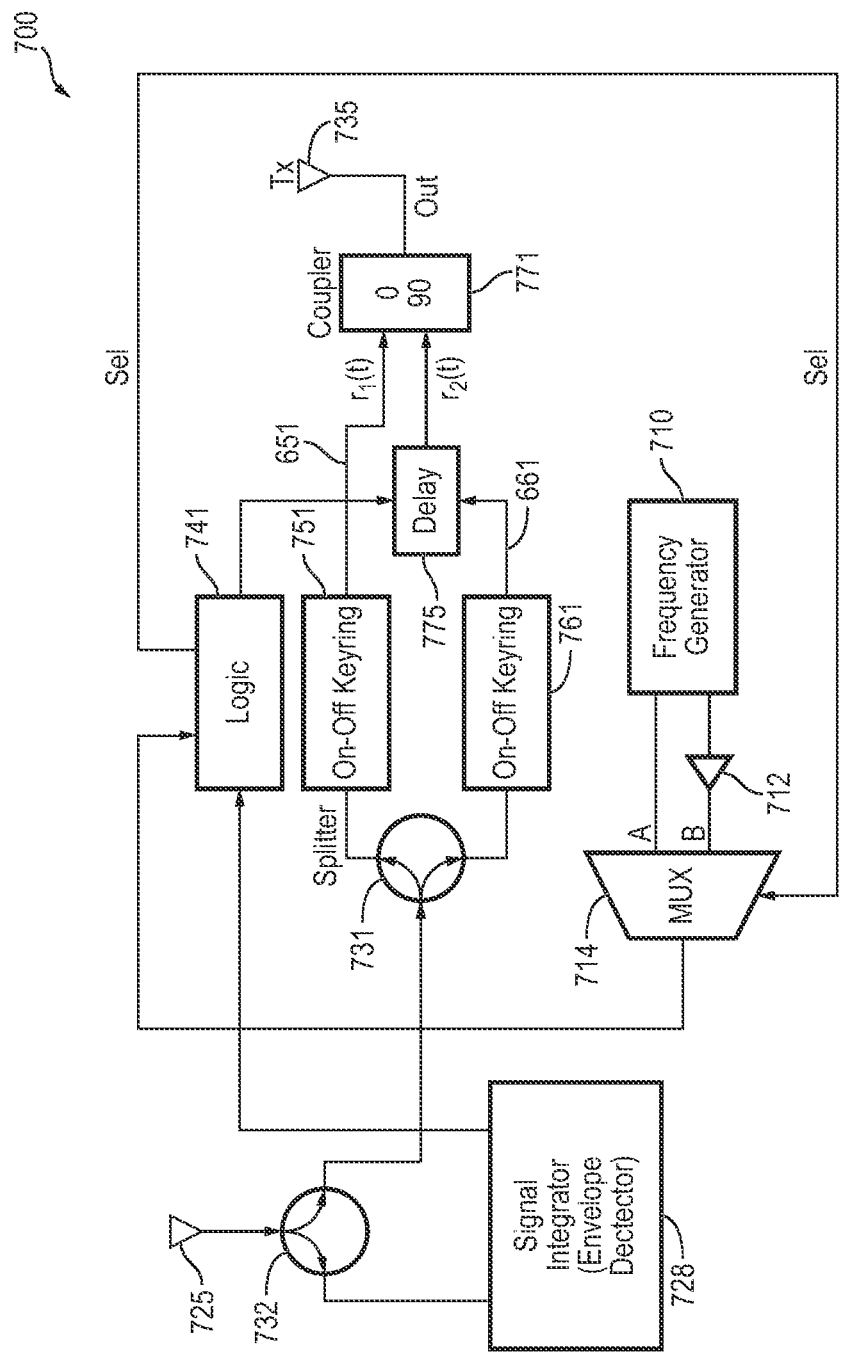
FIG. 7 is a simplified block diagram of a single side-band backscatter tag communication system, in accordance with one exemplary embodiment of the present invention.

FIG. 7 is a simplified block diagram of a single side-band backscatter tag communications system 700, in accordance with one exemplary embodiment of the present invention. Backscatter 700 is shown as including, in part, a receive antenna 725, a signal integrator 728, a frequency generator 710, a first delay element 712, a multiplexer 714, first and second signal splitters 731 and 732, a pair of on-off keying elements 751, a second delay element 775, a control logic 741, a coupler 771, and a transmit antenna 735.

Frequency generator 710 generates an oscillating signal that is delivered to multiplexer directly 714 via path A. The oscillating signal generated by frequency generator 710 is further delayed by delay element 712 and applied to a second terminal of multiplexer 714 via path B. Logic block 741 controls the select input terminal of multiplexer 714. The output of multiplexer 714 is applied to an input terminal of control logic 741.

The WiFi signal is received by receive antenna 725 and delivered to splitter 732. A first portion of the signal split by splitter 732 is delivered to signal integrator 728. Signal integrator 728 is adapted to integrate the WiFi signal received by the receive antenna 725 to generate an envelope WiFi signal applied to control logic 741 and adapted to detect the start of a WiFi packet. The second portion of the signal split by splitter 732 is split by splitter 731 into two signals, one of which is delivered to on-off keying block 751, and another one of which is delivered to on-off keying block 761. Each of on-off keying blocks 751 and 761 multiplies the data received from the splitter by the backscatter tag data (not shown), thereby to generate double side-band signal on paths 651 and 661, respectively. The signal on path 661 is delayed by delay element 775, the amount of which delay is varied by control logic 741. The output of delay element 775 is shifted by 90 degrees and added to the output of on-off keying block 751 by coupler 771 to generate output signal r(t) of backscatter tag 700 which is transmitted by transmit antenna 735. As is described further below, the signal on one path has a negative copy on the one side-band and the same copy on the other side-band. The sum of the signals from the two paths, as generated by coupler 771, eliminates the signal on one side-band and increases the signal on the other side-band, in accordance with one aspect of the present invention.

As described above, both paths receive the same copy of the transmitted signal via splitter 731. The signal in each path is passed through an on-off keying block which is a square-wave multiplier to multiply the received WiFi signal with the data supplied by the backscatter tag (not shown) to shift their respective frequencies. The square wave signal generated on path 651 as a result of this multiplication (frequency shifting) is shown as $r_1(t)$. The square wave signal generated on path 661 as a result of this multiplication is further delayed by $$\frac{1}{4f_t}$$

in the time domain (which is equivalent to $$\frac{pi}{2}$$

phase shift) by delay element 775, and shown below as signal $r_2(t)$.

The mathematical formulation of signal $r_2(t)$ is shown in equation 10 while that of signal $r_1(t)$ is shown in equation 9. As is seen signal $r_2(t)$ has $$\frac{+\pi}{2} \text{ and } \frac{-\pi}{2}$$

phase offset compared to $r_1(t)$ on $f_c - nf_t$ and $f_c + nf_t$, respectively because of the delay of $r_2(t)$. The different phase offset on $f_c - nf_t$ and $f_c + nf_t$ eliminates one of the sidebands.

$$\begin{aligned}
r_1(t) &= \sin(2\pi f_c t) \times s_{tag}(f_o t) \\
&= \frac{4}{\pi} \sum_{n=1,3,5,\ldots \text{ odd}}^{\infty} \frac{1}{n} (2\pi f_c t) \sin(2\pi n f_t t) \\
&= \frac{2}{\pi} \sum_{n=1,3,5,\ldots \text{ odd}}^{\infty} \frac{1}{n} \{\cos(2\pi(f_c - nf_t)t) - \cos((2\pi(f_c + nf_t)t)\}
\end{aligned} \quad (9)$$

-continued $$r_2(t) = \sin(2\pi f_c t) \times S_{tag}\left(f_t\left(t - \frac{1}{4f_t}\right)\right) \quad (10)$$

$$= \frac{4}{\pi} \sum_{n=1,3,5,\ldots \, odd}^{\infty} \frac{1}{n} \sin(2\pi f_c t) \sin\left(2\pi n f_t t - \frac{n\pi}{2}\right)$$

$$= \frac{2}{\pi} \sum_{n=1,3,5,\ldots \, odd}^{\infty} \frac{1}{n} \left\{ \cos\left(2\pi(f_c - nf_t)t + \frac{n\pi}{2}\right) - \cos\left((2\pi(f_c + nf_t)t - \frac{n\pi}{2}\right) \right\}$$

In equations (9) and (10) above, signal $\sin(2\pi f_c t)$ is representative of the WiFi signal received by the backscatter tag, signal $S_{tag}(f_0 t)$ represents the data applied by the backscatter tag to on-off keying block 751, and signal $S_{tag}$ $$\left(f_t\left(t - \frac{1}{4f_t}\right)\right)$$

represents the data applied by the backscatter tag to on-off keying block 761.

As described above, signal $r_1(t)$ and phase-shifted $r_2(t)$ are added so as to cancel $f_c - nf_t$. In other words, $r_2(t)$ is phase shifted (delay it by $$\frac{\pi}{2}$$

in time domain) and then added to $r_1(t)$ to generate the backscattered output signal $r(t)$.

It is understood that another $$\frac{+\pi}{2}$$

phase offset is introduced on the $f_c - nf_t$ frequency component on the delayed path carrying signal $r_2(t)$. Therefore, in total, $\pi$ radians of phase shift is generated on the $f_c - nf_t$ frequency for the delayed path associated with $r_2(t)$ relative to the first path associated with $r_1(t)$, thus $f_c - nf_t$ frequency component gets canceled upon addition with $r_1(t)$. The backscattered signal $r(t)$ is represented as shown in equation 11.

On the other hand the frequency component at $f_c - f_t$ has phase shift $$\frac{-\pi}{2}$$

at the delayed path associated with $r_2(t)$, which undergoes $$\frac{+\pi}{2}$$

in RF domain before addition, thereby resulting in the phase shift of 0° relative to the $r_1(t)$. Therefore, $f_c + f_t$ component gets added constructively and is the only component left uncanceled. As shown in equation 11, the backscattered signal $r(t)$ only contains frequency components in one side band $f_c + nf_t$. FIG. 6 shows the empirically measured backscatter signal strength. As is seen, the single side band design eliminates at least 20 dB of other side band.

$$r(t) = r_1(t) + r_2(t) \angle \frac{\pi}{2} = \quad (11)$$

$$\frac{2}{\pi} \sum_{n=1,3,5,\ldots odd}^{\infty} \left\{ \cos(2\pi(f_c - nf_t)t) - \cos((2\pi(f_c + nf_t)t) + \right.$$

$$\left\{ \cos(2\pi(f_c - nf_t)t - \frac{n\pi}{2} + \frac{\pi}{2}) - \cos(2\pi(f_c + nf_t)t - \frac{n\pi}{2} + \frac{\pi}{2}) \right\} =$$

$$\frac{4}{\pi} \sum_{n=1,3,5,\ldots odd}^{\infty} \frac{1}{n} \{-\cos(2\pi((f_c + nf_t)t)\}$$

$$r(t) = \quad (12)$$

$$r_1(t) + r_2(t) \angle \frac{\pi}{2} = \frac{2}{n} \sum_{n=1,3,5,\ldots odd}^{\infty} \left\{ \cos(2\pi(f_c - f_t)t) - \cos((2\pi(f_c + f_t)t) + \right.$$

$$\left\{ \cos(2\pi(f_c - f_t)t + \frac{\pi}{2} + \frac{\pi}{2}) - \cos(2\pi(f_c + f_t)t) - \right.$$

$$\left. \frac{\pi}{2} + \frac{\pi}{2} \right\} = -\frac{4}{\pi} \cos(2\pi(f_c + f_t)t)$$

FIG. 5 shows the spectrum of the result of an experiment whereby 802.11b signal was transmitted from the transmitter with the backscatter tag, as shown in the Figures and described above, positioned at half a meter from the transmitter and the receiver positioned at 1 meter from the tag. It is seen that a single side band design, in accordance with the embodiments of the present invention, as described above, eliminates at least 30 dB of other side band.

Figure 8:
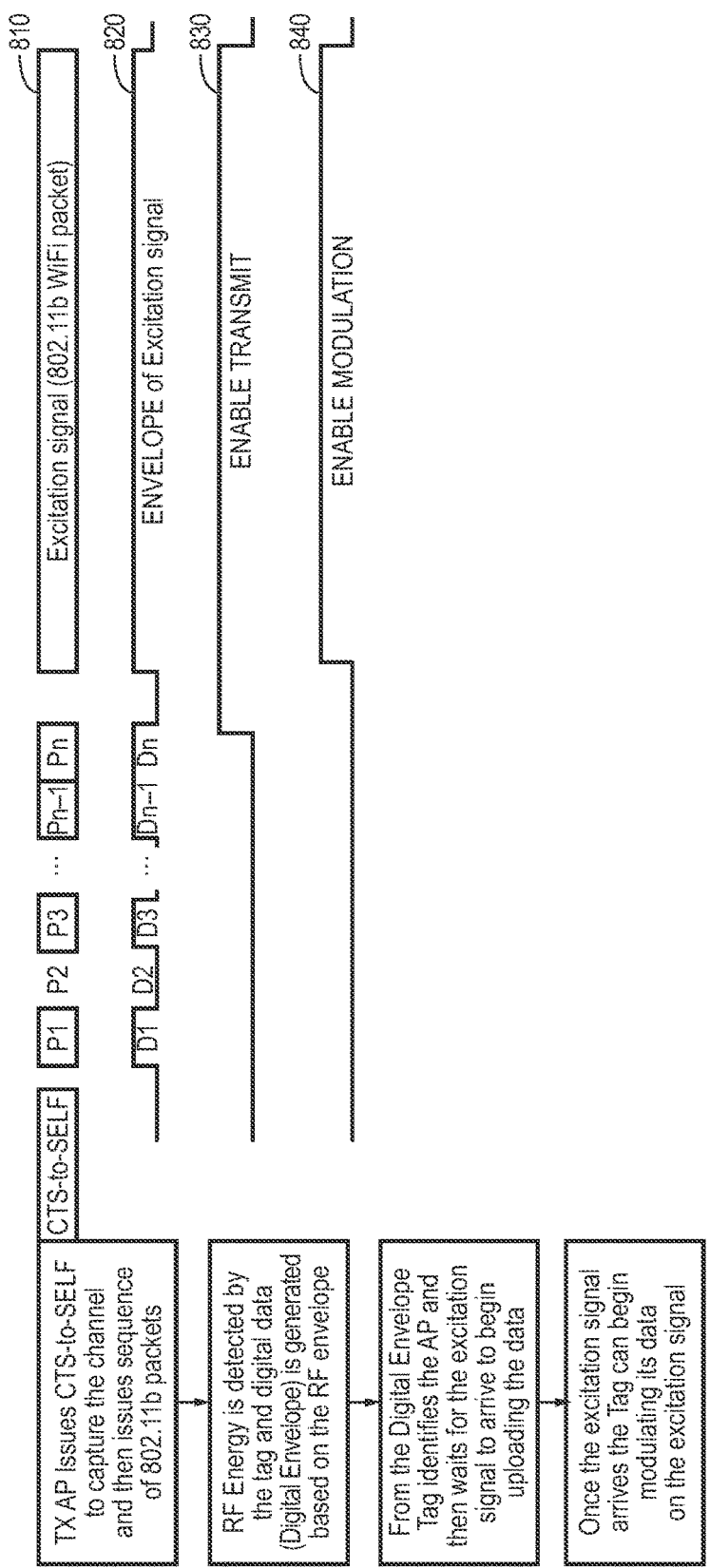
FIG. 8 shows a sequency of 802.11 signal transmission.

In order to synchronize with the backscatter tag for uplink transmission, an 802.11b transmitter sends a sequence of short 802.11b packets in the predetermined packet slots marked as $P_1, P_2, \ldots, P_n$, 810, as shown in FIG. 8. The presence and absence of packets in these predefined slots indicate the data transmitted to the backscatter tag using On-Off keying (OOK) modulation. In order to send data 1, the 802.11b transmitter sends a packet in one time slot. In contrast, the 802.11b transmitter does not send a packet to encode data 0. This 1 and 0 sequence transmitted by the 802.11b transmitter can be identified by the backscatter tag using an analog envelop detector, such as the signal integrator 728 shown in FIG. 7, which generates the sequence 820. The envelop detector runs continuously on the backscatter tag which outputs a signal when the amplitude of the monitored signal is larger or smaller than a threshold. Once the backscatter tag decodes a predefined sequence from the 802.11b transmitter, it embeds the backscattered bits on the next coming WiFi packet, called an excitation packet. Signal 830 is used to enable the transmit sequence and signal 840 is used to enable modulation.

After sending the sequence of short packets for synchronizing with the backscatter tag, the 802.11b transmitter will start sending excitation packets, which are normal 802.11b packets. The backscatter tag captures the rising edge of each excitation packet and embeds the backscattered information on the packet. In order to prevent the backscatter bit stream from corrupting the preamble of the 802.11b packet, the backscatter tag waits for a deterministic time after the backscatter tag detects the starting point of an excitation packet, which is 400 µs in the implementation because the 802.11b packet header is 384 bits and takes 384 µs for transmission. At the end of a tag transmission, the tag embeds an end of packet message in the backscattered data to inform both the 802.11b transmitter and the receiver that the backscatter communication is done.

Referring to FIG. 7, in one embodiment, the clock source used in frequency generator 710 is a ring oscillator supplying a 30 MHz clock signal. The 30 MHz clock is divided into two paths where one is directly connected to multiplexer 714 and the other goes through a delay element 712 before being applied to the multiplexer. This scheme enables the backscatter tag to modulate the 802.11b packets with 0° or 180° degree phase shifting. The 30 MHz clock on the first path carrying signal A is used to shift the 802.11b signal by 30 MHz with 0° degree phase offset. The clock on the second path carrying signal B is used to shift the 802.11b signal by 30 MHz and introduces a 180 phase offset.

As described above, multiplexer 714 is controlled by control logic 741 which may be an FPGA, such as an Igloo Nano AGLN250 FPGA, in one embodiment. To transmit a 0, control logic 741 selects the first path clock where 30 MHz clock with 0° phase offset is used. Similarly, to transmit a 1, control logic 714 selects the second path clock where 30 MHz clock with 180° phase offset is used.

Figure 9:
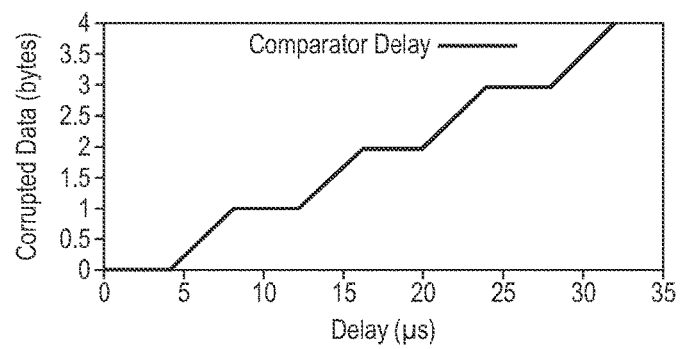
FIG. 9 is a plot of the number of corrupted backscatter data per packet due to synchronization delays.

FIG. 9 is a plot of the number of corrupted backscatter data per packet due to the synchronization delay, as described above. This artificial and controlled delay is introduced by sending 802.11b packets via an SMBV100A signal generator, which allows using a wire to inform the backscatter tag of the starting point of an 802.11b transmission with a deterministic delay. When the delay is smaller than 8 ps, zero bytes of data are corrupted. However, when the delay is between 8 μs and 12 μs, 1 byte of data is corrupted. The number of corrupted data becomes larger when the delay is larger.

Figure 10A:
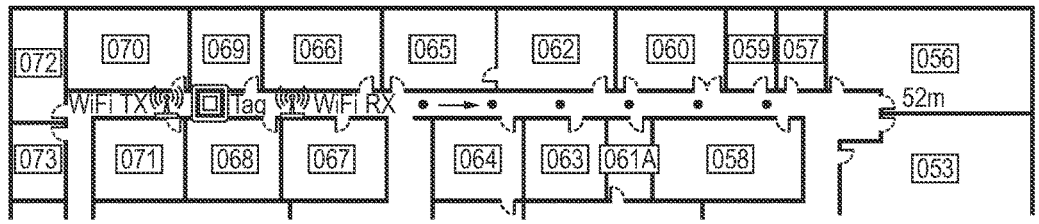
FIGS. 10A and 10B show floorplans and experimental set up of a backscatter tag system respectively in a line-of-sight (LOS) environment and in a non-line-of-sight (NLOS) environment, according to one embodiment of the present invention.
Figure 10B:
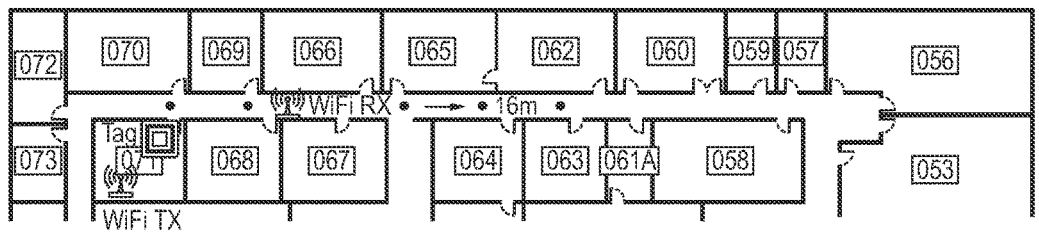

FIGS. 10A and 10B show floorplans and experimental set up of a backscatter tag system respectively in a line-of-sight (LOS) environment and in a non-line-of-sight (NLOS) environment, according to one embodiment of the present invention. In FIG. 10A, all devices are deployed in a hall way. In FIG. 10B, the 802.11b transmitter and the backscatter tag are deployed in a room while the 802.11b receiver is deployed in the hall way, which is separated from the backscatter tag by one or two walls depending on distance. The tag is first positioned 1 m away from the 802.11b transmitter. After, the 802.11b receiver is moved away from the backscatter tag, the achieved throughput, BER and RSSI, are measured across various distances.

Figure 11A:
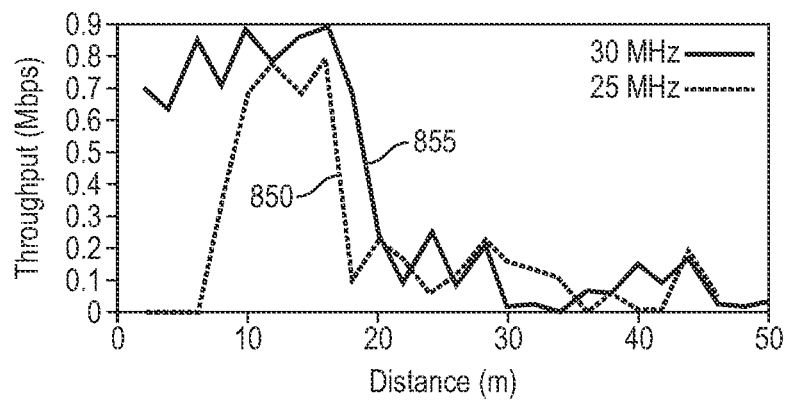
FIG. 11A shows the throughput of a backscatter tag communication system used in an LOS environment, in accordance with one embodiment of the present invention, as a function of distance for two different frequency shifts.

In one embodiment, system performance is quantified using three metrics: throughput, bit error rate (BER), and received signal strength indicator (RSSI). FIG. 11A shows the throughput of the backscatter tag system with increasing range in an LOS environment for both 25 MHz (plot 850) and 30 MHz (plot 855) frequency shifts. The maximal operational distance of the system is shown as 50 m, which is 1.5 to 2 time longer than the range reported by Passive WiFi that leverages a single tone using dedicated hardware as the carrier signal for generating the backscattered 802.11b packets. Furthermore, nearly 1 Mbps throughput is achieve when the 802.11b receiver is 8 m from the backscatter tag. Such throughput meets the requirement of many applications of wearables and Internet of Things where sensor data are collected at a rate of ~100 kbps.

Figure 11B:
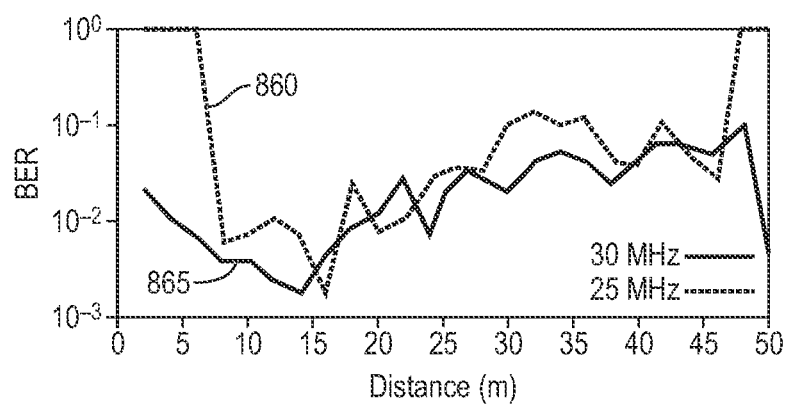
FIG. 11B shows the bit error rates of a backscatter tag communication system, in accordance with one embodiment of the present invention, as a function of distance.
Figure 11C:
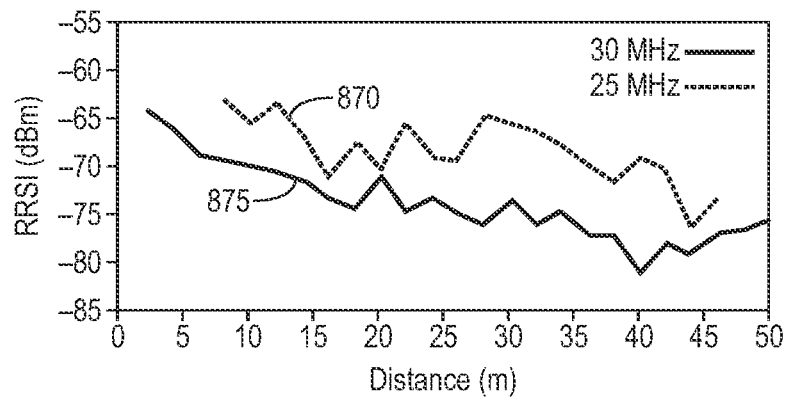
FIG. 11C shows the signal strength of a backscatter tag communication system, in accordance with one embodiment of the present invention, as a function of distance.

When the 802.11b receiver is moved away from the tag, backscatter tag throughput decreases because the backscattered signal strength decreases as shown in plots 870 and 875 of FIG. 11C associated respectively with 25 MHz and 30 MHz frequency shifts. When the 802.11b receiver is more than 20 m away from the backscatter tag, the received backscatter signal strength is below −80 dBm, thus making the decoding more challenging. Plots 860 and 865 of FIG. 11B associated respectively with 25 MHz and 30 MHz frequency shifts show that bit error rate increases from $10^{-2}$ to $10^{-1}$ at longer distances, and as a result throughput decreases.

A trade-off exists between the suppression of self-interference and the backscatter tag power consumption. Compared with the 30 MHz frequency shift, 25 MHz reduces tag power consumption while introducing more self-interference. FIG. 11A shows the throughput of a tag when it shifts the backscattered signal by 25 MHz. Different from the 30 MHz frequency shifting where a tag is able to achieve close to 1 Mbps throughput at close distances, the tag with 25 MHz frequency shifting achieves close to zero throughput when the distance between the tag and the 802.11b receiver is smaller than 6 m. Such a significant difference is caused by the fact that the side lobe of the incident 802.11b signal is relatively strong even when the backscattered signal is 25 MHz away. As a result, severe self-interference is experienced. When the receiver moves further from the tag, self-interference reduces. As a result, the receiver is able to obtain nearly 800 kbps throughput when it is 16 m away from the tag. When the 802.11b receiver is even farther away, the backscattered signal strength decreases. As a result, the backscatter throughput drops again at longer distances.

Figure 12A:
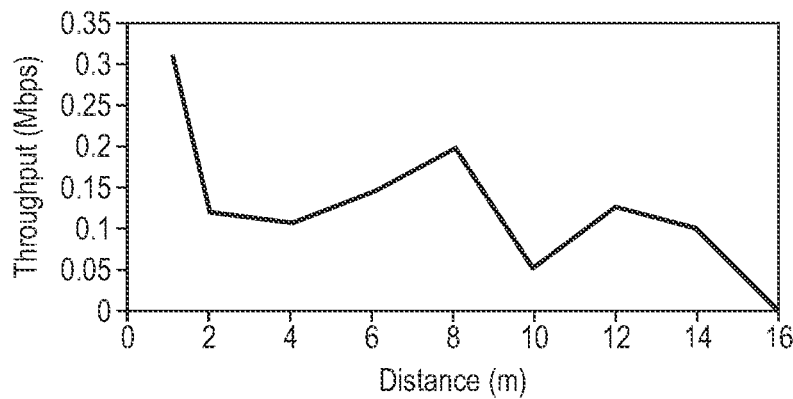
FIG. 12A shows the throughput of a backscatter tag communication system deployed in an NLOS arrangement, in accordance with one embodiment of the present invention, as a function of distance.

FIG. 12A shows the backscatter throughput as a function of distance for a tag deployed in an NLOS arrangement. As is seen, the maximum communication distance achieved is 16 m which is longer than the maximum distance reported by Passive WiFi. Moreover, between 100-300 kbps throughput is achieved when the 802.11b receiver is positioned within 8 m from the tag.

Figure 12B:
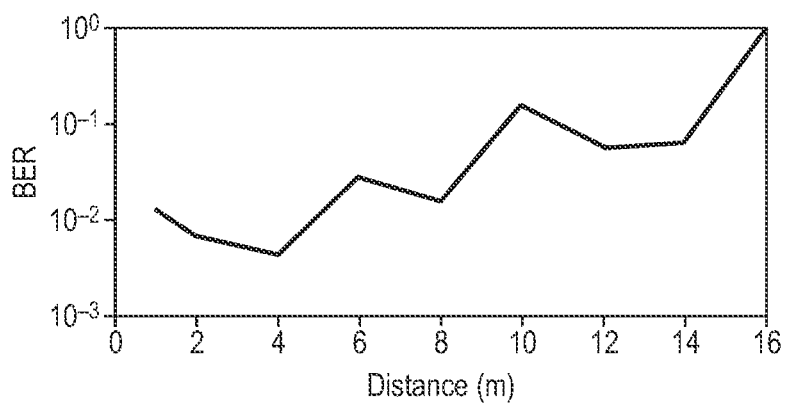
FIG. 12B shows the bit error rate of a backscatter tag communication system deployed in an NLOS arrangement, in accordance with one embodiment of the present invention, as a function of distance.
Figure 12C:
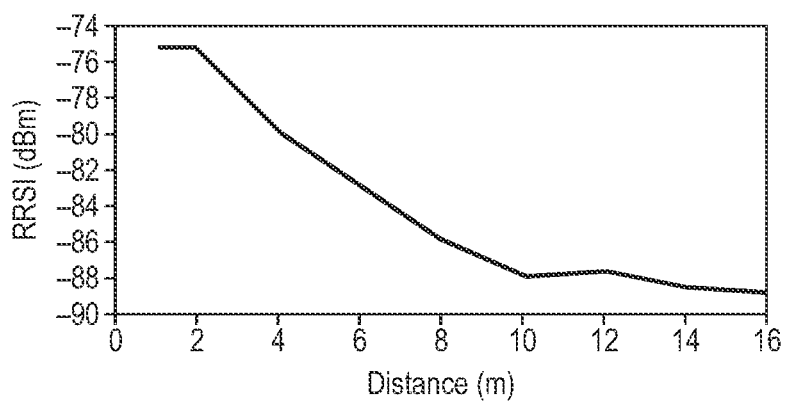
FIG. 12C shows the signal strength of a backscatter tag communication system deployed in an NLOS arrangement, in accordance with one embodiment of the present invention, as a function of distance.

As expected, the throughput and range of a backscatter system degrades in a NLOS deployment compared with the LOS deployment. For example, the maximum communication distance shown as achieved is 16 m, which is shorter than the 52 m for the LOS deployment. Such performance degradation is caused by the lower backscattered signal strength as shown in FIG. 12C. The backscattered signal strength is shown as being −76 dBm when the 802.11b receiver is 1 m away from the tag, which is 10 dB lower than the LOS deployment because there is a wall between the tag and the 802.11b receiver in the NLOS deployment. When the distance between the tag and the 802.11b receiver increases, the backscattered signal strength drops sharply. When the 802.11b receiver is more than 10 meters away, the backscattered signal strength is around −88 dBm, close to the noise floor. As a result, decoding backscattered signal becomes much harder. FIG. 12B shows the BER for the NLOS system, as shown in FIG. 10B.

Figure 13A:
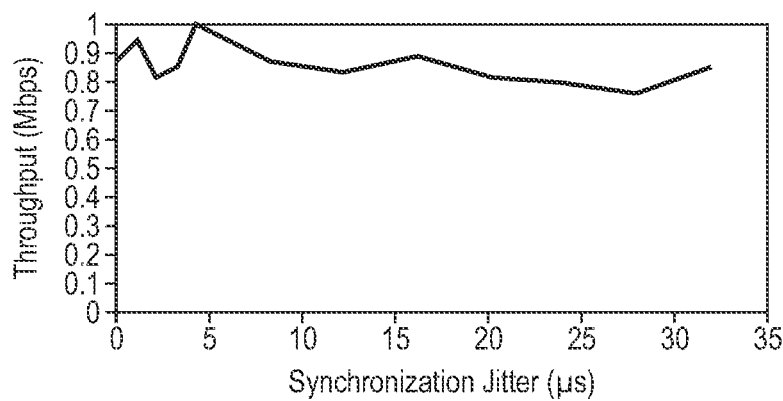
FIGS. 13A, 13B, and 13C respectively show the throughput, bit error rate and RSSI of a backscattered signal when 0.6 μs to 32 μs jitter is introduced, in accordance with one embodiment of the present invention.
Figure 13B:
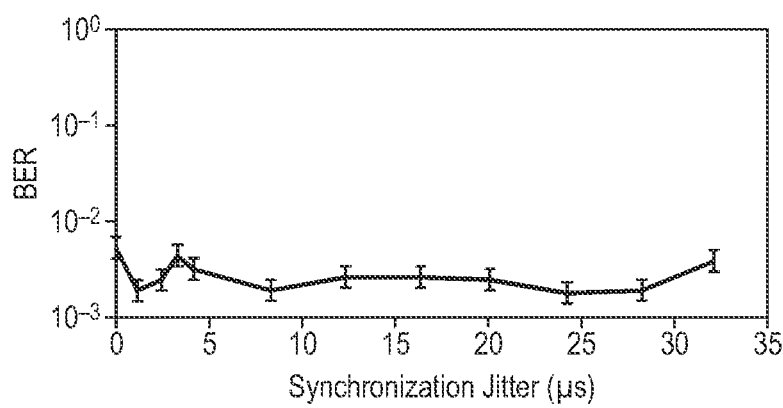
Figure 13C:
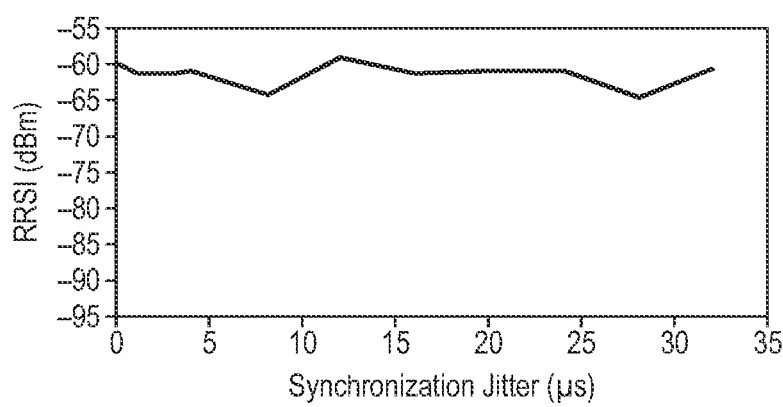

FIGS. 13A, 13B, and 13C respectively show the throughput, BER, and RSSI of a backscattered signal when 0.6 μs to 32 μs jitter is introduced. The backscatter throughput decreases when the jitter value increases. However, the throughput degradation is not seen as significant. The reason is that only the first several bits of a backscatter packet are corrupted. The rest of the backscatter packet are decoded correctly. In addition, the empirically measured jitter is less than 2 μs across distances. Therefore, the throughput degradation is even smaller. FIGS. 13B and 13C show a similar conclusion where similar bit error rate, as well as received backscattered signal strength is achieved when the jitter value changes from 0.6 μs to 32 μs.

Figure 14:
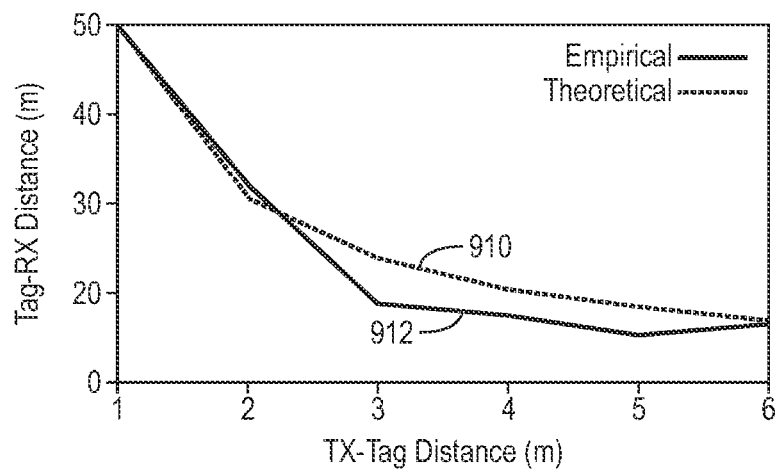
FIG. 14 shows the communication range between a theoretical calculation and empirically acquired data from a backscatter tag system, according to an embodiment of the present invention.
Figure 17:
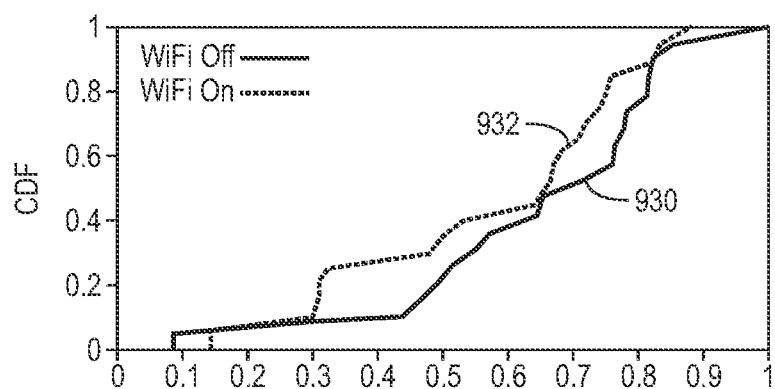
FIG. 17 shows the impact of an active WiFi transmission between two laptops on the throughput of a backscatter tag, in accordance with one exemplary embodiment of the present invention.

FIG. 14 shows the communication range data between theoretical calculation 910 and empirically acquired data 912 from a backscatter tag system, according to an embodiment of the present invention. Since a backscatter tag performance depends on both the 802.11b transmitter-to-tag distance and the 802.11b receiver-to-tag distance, in an experimental setup first the 802.11b TX-to-tag distance is fixed and the maximum 802.11b RX-to-tag distance where backscatter decoding succeeds is measured. This measurement is repeated for a number of 802.11b transmitter-to-tag distances. FIG. 14 shows the empirically measured communication range of such a system. Backscatter communication still succeeds when the tag is 50 m away from the 802.11b receiver or 6 m away from the 802.11b transmitter. In this setting, the backscatter tag failed to operate properly at very long distances from the 802.11b transmitter because the backscatter tag could not identify the excitation packet sent by the transmitter. In addition, the backscatter tag may not be far away from both of the 802.11b transmitter and receiver either. For example, when the backscatter tag is 6 m away from the 802.11b transmitter, the maximum distance between the 802.11b receiver and the backscatter tag is 8 m. The theoretical communication range of the system using the Friis model is calculated and the backscattered signal strength measured when the tag is 50 m away from the 802.11b transmitter. As shown in FIG. 17, the theoretical curve 910 matches the empirically measured curve 912 well except that the empirically measured communication distance is shorter.

Power Consumption

Figure 15:
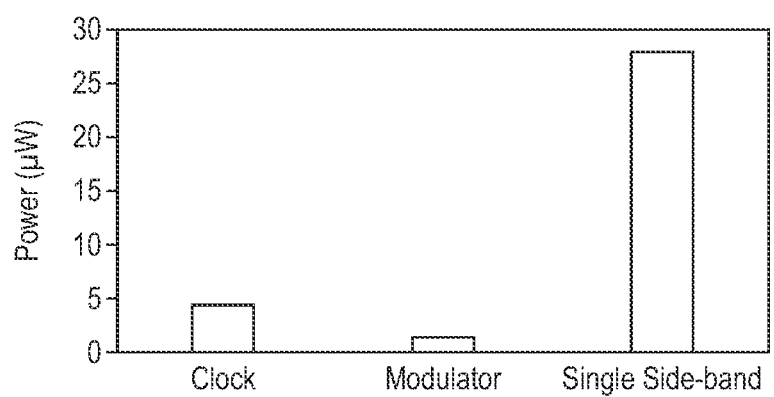
FIG. 15 shows a breakdown of the power consumed by different components of a backscatter tag, in accordance with one exemplary embodiment of the present invention.

FIG. 15 shows a breakdown of the power consumed by different components of the tag, which is obtained by using a 45 nm power analysis tool in one experimental setup. The clock module, which generates a 30 MHz clock for the rest of the system, is shown as consuming 4 µW of power. The data modulator, which embeds backscattered bits on top of the 30 MHz clock, is shown as consuming 1 µW of power. The module which is responsible for generating the single side-band backscatter is shown as consuming 28 µW of power. The total power consumed by the system is 33 µW, which is less than 59.2 µW consumed by a Passive WiFi system. In addition, many energy harvesting system, such as small solar panel, are able to provide continuous power above 33 µW even in indoor environment. Therefore, the tag has the potential of being deployed without batteries.

Co-Existence with Wi-Fi Networks

To determine the extent to which a backscatter tag, in accordance with embodiments of the present invention, may co-exists concurrently with another WiFi communication system, the following experiment is performed. In this experiment, a backscatter tag is deployed 4 m away from an 802.11b transmitter. The 802.11b transmitter is positioned 3 m away from a laptop, which transmits continuous WiFi packets to another laptop that is positioned 5 m away from the 802.11b transmitter. The 802.11b transmitter sends 802.11b packets on channel 7 (2.442 GHz), the tag shifts the backscattered signal by 30 MHz to channel 13 (2.472 GHz), and WiFi stream is run between the two laptops on channel 1 (2.412 GHz).

Figure 16:
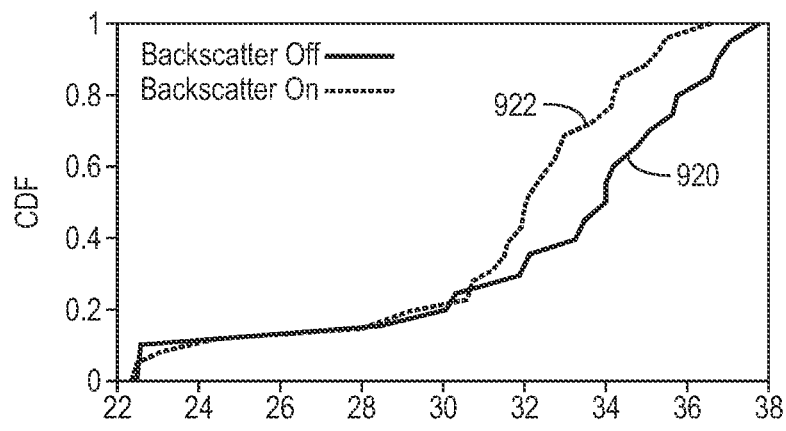
FIG. 16 shows the WiFi throughput between the two laptops for two conditions when a backscatter tag is present and absent, in accordance with one exemplary embodiment of the present invention.

FIG. 16 shows the WiFi throughput between the two laptops when backscatter is present and absent. When the backscatter transmission is turned off, as shown in plot 920, the median WiFi throughput achieved is 33.9 Mbps. The WiFi throughput varies between 22 Mbps and 38 Mbps because of human movement nearby. When the backscatter is present, as shown in plot 922, the median WiFi throughput drops by 5% to 32 Mbps. As a result, the backscatter does not cause severe interference on the WiFi streams. The reason is that the backscattered signal does not have overlapping spectrum with the active WiFi transmission. Further, the backscattered signal strength is usually below −70 dBm, much lower than the signal strength of the active WiFi transmission. As a result, backscatter communication does not severely impact active WiFi transmission To determine the impact of an active WiFi transmission between two laptops on the throughput of backscatter communication, the backscatter throughput when the WiFi stream between the two laptops is present and absent is measured as shown in FIG. 17. When as the WiFi stream on the laptops is turned off, as shown in plot 930, the median backscatter throughput achieved is 0.71 Mbps. When the WiFi stream is present, as shown in plot 932, the median backscatter throughput drops by 7% to 0.66 Mbps. The impact is relatively small because the backscattered signal is 60 MHz away from the WiFi stream on the frequency domain and any interference leaking in the frequency domain is quite small.

IMPLEMENTATION

In the above experimental setup, an 802.11b receiver of a Mac-book Pro laptop, which has a WiFi card that runs the 802.11a/b/g/n/ac protocols is used. A sniffer tool is embedded in the Wireless Diagnostics application to set the desired channel to receive the backscattered signal. A tcpdump was used to analyze the received WiFi packets and extract the backscattered information. A signal generator is used as the standard 802.11b transmitter. The signal generator is able to output a marker signal that indicates the beginning of an 802.11b packet. The above experiments show the following. The prototype tag achieves an uplink backscatter range of 50 m in line-of-sight scenarios, which is twice better than conventional backscatter systems such as Passive WiFi In non-line-of-sight (NLOS) deployment. The prototype system achieves a range of 16 m even when the backscatter signal has to pass through two walls. The prototype tag achieves close to 1 Mbps throughput when the receiver is less than 8 m from the tag in LOS deployment. At farther distances and NLOS deployment, the prototype achieves an average of 273 kbps and 144 kbps throughput respectively. This shows that backscatter decoding operates properly even when the tag is 6 m away from the 802.11b transmitter. The prototype tag consumes power on the order of 33 µW despite the fact that it moves the backscattered signal into another band.

One factor that potentially impacts the performance of the system is the time-domain jitter between the tag bits stream and the 802.11b bits stream. In the above experiments, a signal generator is used to transmit 802.11b packets. This signal generator outputs a signal that indicates the start of an 802.11b packet. A wire feeds this signal to the tag and informs the tag when the 802.11b packet transmission starts. More importantly, a deterministic delay is introduced on this signal to emulate the time-domain jitters experienced by the tag.

The above descriptions of embodiments of the present invention are illustrative and not limitative. For example, the various embodiments of the present inventions are not limited by the communication protocol, 802.11b or otherwise, used for signal transmission. Other modifications and variations will be apparent to those skilled in the art and are intended to fall within the scope of the appended claims.

What is claimed is:

1. A backscatter tag communicate device comprising:
  a receiver configured to receive a WiFi packet conforming to a communication protocol defining a plurality of codewords;

a mapper configured to map at least a first subset of the plurality of codewords disposed in the packet to a second plurality of codewords defined by the protocol;

a frequency shifter configured to shift a frequency of the second plurality of codewords such that the frequency shifted codewords are characterized by a single sideband spectrum;

a first signal splitter configured to split a WiFi signal representative of the WiFi packet into first and second signals;

a first on-off keying block disposed in a first path and adapted to receive the first signal; and a second on-off keying block disposed in a second path and adapted to receive the second signal.

2. The backscatter tag communication device of claim 1 wherein said communication protocol is the 802.11b communication protocol.

3. The backscatter tag communication device of claim 2 wherein said mapper is further configured to map the at least first subset of the plurality of codewords by changing phases of the at least first subset of the plurality of codewords.

4. The backscatter tag communication device of claim 1 further comprising:

a delay element adapted to delay the first signal to generate a third signal.

5. The backscatter tag communication device of claim 4 further comprising a coupler configured to:

receive an output of the first on-off keying block;

receive a delayed output of the second on-off keying block;

shift a phase of the delayed output of the second on-off keying block; and combine the output of the first on-off keying block with the phase-shifted delayed output of the second on-off-keying block, said combined output being the single sideband signal of the backscatter tag communication device.

6. The backscatter tag communication device of claim 5 further comprising:

a second signal splitter adapted to receive the WiFi signal from a receive antenna and supply the received WiFi signal to the first signal splitter; and a signal integrator adapted to integrate the WiFi signal received from the second splitter and deliver the integrated signal to a control logic.

7. The backscatter tag communication device of claim 6 further comprising:

a multiplexer configure to select between an oscillating signal or a delayed replica of the oscillating signal in response to a select signal the multiplexer receives from the control logic.

8. The backscatter tag communication device of claim 7 wherein said multiplexer is further configure to deliver the selected signal to the control logic.

9. A method of communication via a backscatter tag, the method comprising:

receiving a packet conforming to a WiFi communication protocol defining a plurality of codewords;

mapping at least a first subset of the plurality of codewords disposed in the packet to a second plurality of codewords defined by the protocol;

shifting a frequency of the second plurality of codewords such that the frequency shifted codewords are characterized by a single sideband spectrum;

splitting a WiFi signal representative of the WiFi packet into first and second signals using a first signal splitter;

supplying the first signal to a first on-off keying block disposed in a first path; and supplying the second signal to a second on-off keying block disposed in a second path.

10. The method of claim 9 wherein said communication protocol is the 802.11b communication protocol.

11. The method of claim 10 further comprising:

mapping the at least first subset of the plurality of codewords to a second plurality of codewords by changing phases of the at least first subset of the plurality of codewords.

12. The method of claim 9 further comprising:

delaying the first signal to generate a third signal.

13. The method of claim 12 further comprising:

receiving an output of the first on-off keying block;

receiving a delayed output of the second on-off keying block;

shifting a phase of the delayed output of the second on-off keying block; and combining the output of the first on-off keying block with the phase-shifted delayed output of the second on-off-keying block to generate the single sideband signal at an output of the backscatter tag.

14. The method of claim 13 further comprising:

splitting the received the WiFi signal from a receive antenna using a second splitter;

supplying a first WiFi signal split by the second splitter to the first signal splitter; and integrating the second WiFi signal split by the second splitter; and delivering the integrated signal to a control logic.

15. The method of claim 14 further comprising:

selecting between an oscillating signal or a delayed replica of the oscillating signal in response to a control signal supplied by the control logic.

16. The method of claim 15 further comprising:

delivering the selected signal to the control logic.

\* \* \* \* \*